(12) United States Patent
Thompson et al.

(10) Patent No.: US 11,261,292 B2
(45) Date of Patent: Mar. 1, 2022

(54) PET COMPOSITION, PET PREFORM, REFILLABLE PET BOTTLE AND METHODS FOR MAKING THE SAME

(71) Applicant: ALPEK POLYESTER, S.A. DE C.V., Nuevo Leon (MX)

(72) Inventors: David Eugene Thompson, Charlotte, NC (US); Damian Adrian Salazar Hernandez, Charlotte, NC (US)

(73) Assignee: ALPEK POLYESTER, S.A. DE C.V., Nuevo Leon (MX)

( * ) Notice: Subject to any disclaimer, the term of this patent is extended or adjusted under 35 U.S.C. 154(b) by 0 days.

(21) Appl. No.: 16/557,337

(22) Filed: Aug. 30, 2019

(65) Prior Publication Data

US 2020/0079900 A1 Mar. 12, 2020

Related U.S. Application Data

(60) Provisional application No. 62/727,920, filed on Sep. 6, 2018.

(51) Int. Cl.
| | | |
|---|---|---|
| *C08G 63/199* | (2006.01) | |
| *B65D 1/02* | (2006.01) | |
| *B29B 11/08* | (2006.01) | |
| *B29K 67/00* | (2006.01) | |

(52) U.S. Cl.
CPC ............ *C08G 63/199* (2013.01); *B29B 11/08* (2013.01); *B65D 1/0207* (2013.01); *B65D 1/0246* (2013.01); *B65D 1/0276* (2013.01); *B29B 2911/14593* (2013.01); *B29B 2911/14973* (2013.01); *B29K 2067/003* (2013.01); *C08G 2390/00* (2013.01)

(58) Field of Classification Search
CPC ..................... B29B 11/08; B29B 11/14; B29B 2911/14593; B29B 2911/14633; B29B 2911/14973; B29B 2911/1498; B29C 49/0005; B29C 49/06; B29K 2067/00; B29K 2067/003; B29K 2105/0094; B29L 2031/7158; B65D 1/0207; B65D 1/0246; B65D 1/0276; B65D 1/0284; C08G 2390/00; C08G 63/183; C08G 63/199; C08G 63/866
See application file for complete search history.

(56) References Cited

U.S. PATENT DOCUMENTS

| | | |
|---|---|---|
| 5,066,528 A | 11/1991 | Krishnakumar et al. |
| 5,409,983 A | 4/1995 | Jones et al. |
| 5,780,130 A | 7/1998 | Hansen et al. |
| 5,837,800 A | 11/1998 | Suzuki et al. |
| 5,888,598 A | 3/1999 | Brewster et al. |
| 5,976,653 A | 11/1999 | Collette et al. |
| 6,309,718 B1 | 10/2001 | Sprayberry |
| 6,586,558 B2 | 7/2003 | Schmidt et al. |
| 6,783,827 B2 | 8/2004 | Jen |
| 6,913,806 B2 | 7/2005 | Jen |
| 7,129,317 B2 | 10/2006 | Moore et al. |
| 7,572,493 B2 | 8/2009 | Shi |
| 8,318,842 B2 | 11/2012 | Jen |
| 8,968,849 B2 | 3/2015 | Scantlebury |
| 2003/0144459 A1* | 7/2003 | Fujimori ............... C08G 63/82 528/275 |
| 2004/0236066 A1* | 11/2004 | Moore ................... C08G 63/80 528/308.1 |
| 2008/0274317 A1* | 11/2008 | Thompson ............. C08G 63/82 428/35.8 |
| 2009/0176046 A1* | 7/2009 | Thompson ........... C08G 63/183 428/35.8 |
| 2009/0306313 A1* | 12/2009 | Nichols .................. C08G 63/78 526/75 |
| 2010/0178524 A1* | 7/2010 | Yoshimura ............. B32B 27/08 428/480 |
| 2018/0079859 A1 | 3/2018 | Moffitt et al. |
| 2018/0148213 A1 | 5/2018 | Moore et al. |
| 2020/0079900 A1* | 3/2020 | Salazar Hernandez ..................... B65D 1/0276 |

* cited by examiner

*Primary Examiner* — Ling Siu Choi
*Assistant Examiner* — Gennadiy Mesh
(74) *Attorney, Agent, or Firm* — Oblon, McClelland, Maier & Neustadt, L.L.P.

(57) ABSTRACT

A polyethylene terephthalate composition (PET), an injection-molded bottle preform made from a PET composition, a refillable PET container blow-molded from the preform, catalyst compositions used for making the PET composition, methods for making the PET composition, methods for injection-molding a PET bottle preform, methods for blow-molding a refillable PET bottle from a preform and methods for improving the rewash stability and recyclability of refillable PET bottles particularly for carbonated soft drinks are disclosed. The polyethylene terephthalate composition includes a polyester resin containing terephthalic acid, isophthalic acid, ethylene glycol and cyclohexane dimethanol and residual amount of catalytic composition comprising Sb and Ti. The polyethylene terephthalate composition is especially useful for large blow moldings and provides a change in the fill point volume after 5 wash cycles of a 2.5 liter blow molded bottle of 14 ml or less.

2 Claims, 14 Drawing Sheets

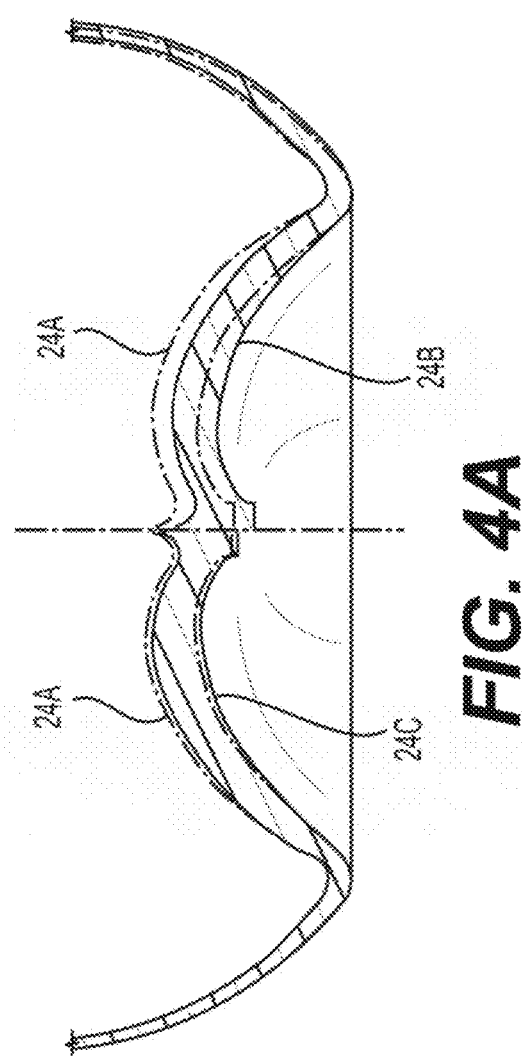
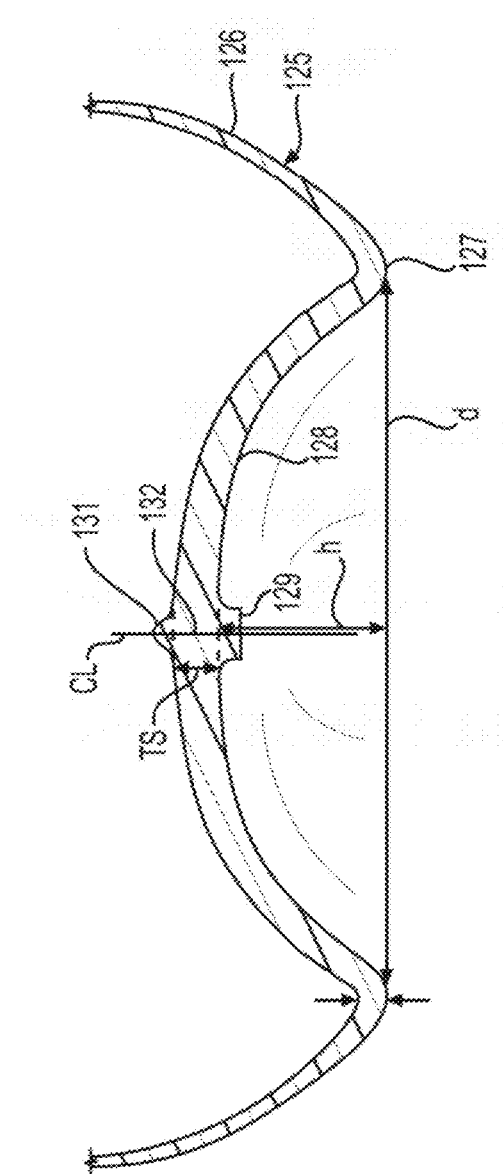

PET COMPOSITION, PET PREFORM, REFILLABLE PET BOTTLE AND METHODS FOR MAKING THE SAME

BACKGROUND

Field of the Invention

The present disclosure relates generally to a polyethylene terephthalate composition (PET), an injection-molded bottle preform made from a PET composition, a refillable PET container blow-molded from the preform, catalyst compositions used for making the PET composition, methods for making the PET composition, methods for injection-molding a PET bottle preform, methods for blow-molding a refillable PET bottle from a preform and methods for improving the rewash stability and recyclability of refillable PET bottles.

Description of the Related Art

Carbonated soft drinks (CSD) are popular around the world. Generally containing juices and/or flavorings in combination with sweeteners, CSDs contain carbonation in the form of dissolved $CO_2$ to slightly acidify the drink and to provide desirable mouth-feel or texture. Carbonated soft drinks are commercially available to the consumer in many serving forms but are perhaps most popular in the form of individual bottled servings.

Bottling a carbonated soft drink presents several challenges. One challenge is to maintain carbonation of the soft drink for a period sufficient to provide acceptable shelf life. The bottle must be leak-proof and sealable to prevent ingress of contaminants or leakage of the soft drink out of the bottle. The cost of the bottling/packaging should represent a relatively small portion of the total soft drink cost and provide sufficient resilience and toughness to avoid breakage and leakage. Conventional containers such as glass bottles and/or aluminum cans have slowly been replaced by lighter weight packaging such as polyethylene terephthalate (PET) bottles.

PET containers/bottles provide significant advantages for individually bottled carbonated soft drinks. PET, copolymers thereof, and compositions thereof can be tailored to resist the egress of carbon dioxide (carbonation) from the bottle and to resist the ingress of oxygen into the bottle which might otherwise result in staleness or off-flavor. PET bottles are further advantageous for their clarity which permits the consumer to visually inspect the contents of the bottle. Recently PET containers have seen increased use for large volume storage such as water bottles or for the delivery and storage of industrial fluids. PET bottles are recyclable and can be re-molded to form new bottles or other articles.

PET has significant advantages over other polymer resins such as polyolefins and polycarbonates. Polyolefins tend to have lower resistance to stress and puncture in comparison to PET whereas polycarbonates suffer from a public perception as a source of dangerous contaminants such as bisphenol and/or other degradation products of polycarbonate resins. PET offers exceptional clarity and exceptional resistance to gas permeation. PET bottles strongly resist the ingress of gas or odors that might otherwise lead to an off-taste. PET also offers the advantage of well-established recycling systems that are supported by a significant polymer recycling infrastructure that is used to collect and recycle conventional single serving soft drink or beverage containers.

PET bottles have conventionally been recycled through a process that includes grinding or chopping the bottles into pieces to form PET flakes, washing the flakes under various conditions of acidity and alkalinity, sorting according to color and polymer type, melting, either alone or in combination with virgin PET polymer material, and re-extrusion to form a PET resin in the form of pellets. The pellets can be used alone or in combination with virgin PET pellets to make new carbonated soft drink bottles. Conventional PET recycling processes require significant investment in facilities and are generally complex with respect to sorting, washing, melting and extrusion. The recycled PET resin may have varying levels of quality, often excluding its reuse in bottling applications. This contrasts with the recycle and reuse of conventional glass bottles which can be washed and reused almost indefinitely without requiring replacement.

A less costly and more environmentally friendly alternative for recycling PET bottles is to use a refillable PET bottle similar to the reuse and/or refilling of glass containers. Refilling a PET bottle provides many advantages over conventional PET recycling by reducing the intensity of energy needed for recycling, simplifying the recycling process and reducing the footprint and capital cost of the recycling infrastructure.

However, bottles formed from polymer materials such as conventional PET are substantially more sensitive to the high temperatures and alkaline/acidic conditions of washing that are used for recycling refillable glass bottles. In order to ensure product consistency and public safety, a bottle must be subject to high temperature washing (up to 90° C.) before being refilled and returned to service. Further, in order for refillable PET bottles to be economically viable they must be capable of undergoing multiple wash cycles without degradation such as loss of strength or loss optical clarity. Conventional PET resins used for manufacturing refillable PET bottles, such as heat set PET resins, are unsuitable as feedstocks for multiple-wash refillable PET bottles. Even after a single high temperature caustic wash, a PET bottle made from a conventional PET resin may undergo significant degradation in physical and optical properties.

In order to provide acceptable optical clarity for bottle packaging purposes, conventional PET resins often contain a co-monomer such as isophthalic acid (IPA). The co-monomer serves the function of disrupting the linearity of the PET chains thereby reducing the tendency towards crystallization. Reduced crystallization results in improved haze (e.g., a reduced haze value) and improved optical properties (e.g., increased luminosity and/or visible light transmittance). Small amounts of IPA comonomer such as from 1-10% by weight may considerably change properties such as crystallization temperature and the heat of crystallization of the PET resin. Comonomer-modified resins are therefore sometimes favored for applications that require fast processing. Increasing the amount of comonomer may in some circumstances lessen the time necessary to complete injection molding and/or blow molding and may permit the production of bottles and preforms of improved clarity. This gain in efficiency (e.g., improved blow molding cycle time and an improved injection molding/blow molding process window) is however balanced with a greater tendency towards variability in the manufacturing process and consequently an increased incidence of bottle failures, especially when the bottle is subject to high stress such as in repeated caustic hot water wash conditions. Increased comonomer content may lead to thermal creep and expansion, and thereby lower bottle burst pressure, i.e., problems that are not tolerable in the refillable bottle applications.

Further counteracting the advantage obtained by use of a comonomer is the need to use an effective and economical catalyst such as antimony during the polymerization/polycondensation of the dicarboxylic acid and diol units which represent the repeating units of the PET resin. Certain catalysts, catalyst particles and/or catalyst residues, especially catalysts that contain antimony (Sb), act as nucleators that increase the tendency of a PET resin to undergo crystallization. This propensity towards crystallization can be reduced somewhat by the use of catalysts that have non-nucleating components/metals such as Ti-, Al- and/or Li-based catalysts.

Some of the properties which make conventional PET resins desirable for use in carbonated soft drink bottles, such as relatively low glass transition temperature (Tg) and melting temperature (Tm), are disadvantageous for refillable bottle applications. As noted above, conventional PET resins are subject to crystallization which imparts haze to the resin. While this haze can be avoided in part by using optimized blow-molding and injection-molding conditions for preparing preforms and/or finished bottles, exposure to the high temperature conditions needed to return a refillable bottle to service causes significant haze to develop and degrades other physical properties such as toughness and resiliency to the point that the bottle is no longer eligible to be returned to service. Increased haze alone, without other physical degradation, substantially reduces the visual appeal of the bottle and disqualifies conventional PET resins from use in multiple-wash refillable PET bottle applications such as for carbonated soft drink bottles.

The present disclosure addresses the drawbacks of prior art PET resins and PET containers by providing a resin, PET composition, PET preform and PET bottle that have advantageous crystallinity characteristics, resist crystallinity changes, and resist development of haze after repeated wash cycles.

In order to address the difficulties and problems associated with the use of conventional PET resins for making refillable PET bottles, one objective of the present disclosure is to provide a PET resin and method of making the PET resin using a catalyst that contains a non-nucleator component, the use of the PET resin for making a preform and a method of blow-molding the pre-form to form a refillable PET carbonated soft drink bottle. Another objective of the present disclosure is to provide a refillable carbonated soft drink bottle having improved resistance to multiple wash cycles and improved physical and optical properties. A still further objective is to provide a refillable PET bottle with an unconventional comonomer content that has a reduced content of nucleating residues and thus does not sacrifice clarity.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF SUMMARY OF THE INVENTION

The invention overcomes the problems and disadvantages of the prior art as described in the various embodiments below.

In one embodiment of the present disclosure, a PET resin having a low comonomer (IPA) content is made by catalyzing the esterification and polycondensation of a mixture of a dicarboxylic acid and a diol with a catalyst that contains a reduced amount or is free of nucleating catalyst metals such as antimony.

In another embodiment the resultant PET resin is used to injection mold heavyweight preforms having low haze.

In another embodiment subsequent blow molding of the heavyweight preforms provides a refillable PET container that has significantly improved heat stability, dimensional stability and structural stability in combination with excellent optical properties.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A shows a champagne base structure of a refillable PET container;

FIG. 4B shows a champagne base structure of a refillable PET container;

DETAILED DESCRIPTION OF THE EMBODIMENTS

Figure 1:
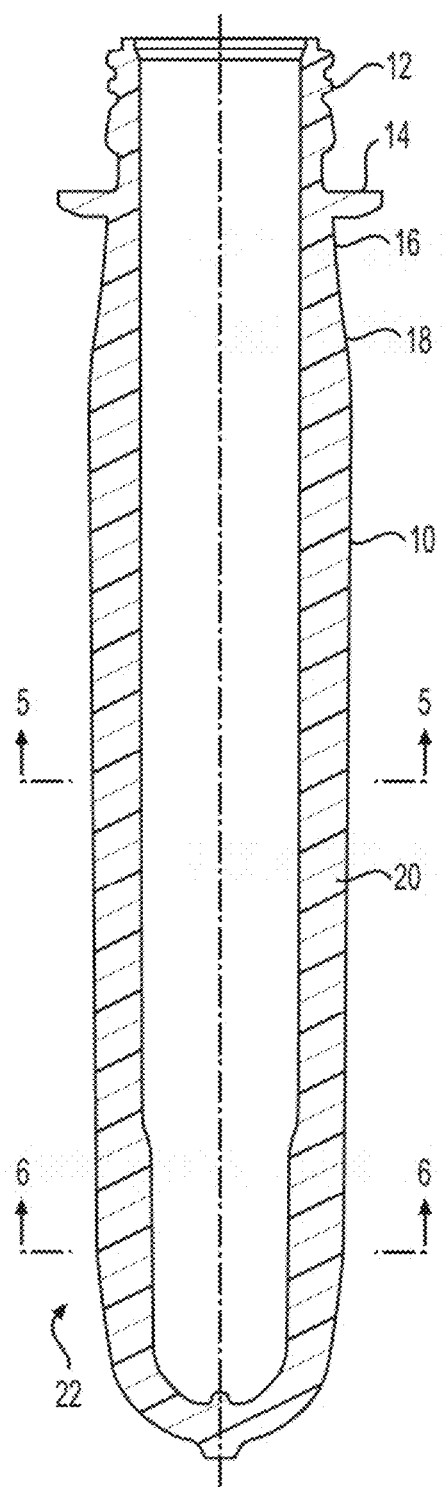
FIG. 1 shows the structure of a preform in one embodiment of the invention.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

In one aspect, the invention embraces methods for making polyester resins such as PET. In this regard, the method generally includes reacting a mixture of dicarboxylic acid (terephthalate) component and a diol component (e.g., a mixture of one or more terephthalate moieties and one or more diol moieties) in the presence of a catalyst composition that contains a non-nucleating component to form a polyethylene terephthalate precursor in an esterification reaction that forms ester oligomers and monomeric ester units. Subsequent melt phase polycondensation forms polymers of polyethylene terephthalate of a desired molecular weight. During polycondensation, which is usually enhanced by catalysts (e.g., the non-nucleating catalyst described herein), water and glycol are continuously removed to create favorable reaction kinetics. Once isolated as a solid material, the PET can be further polycondensed in the solid state by solid state polymerization (SSP). During SSP, the polymerization is continued at temperatures substantially lower than the melt phase polycondensation to form a product having a final intrinsic viscosity. Preferably the catalyst(s) present during the esterification, polycondensation and solid state polymerization have a reduced content of nucleating metals (further described below).

When reacting a diacid component and a diol component via a direct esterification reaction, the molar ratio of the diacid component and the diol component is typically between about 1.0:1.0 and 1.0:1.6. Alternatively, in reacting a diester component and a diol component via an ester interchange reaction, the molar ratio of the diester component and the diol component is typically greater than about 1.0:2.0.

The polyesters described herein can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. Typically a PET production process involves esterification to convert or react about 95-98% of the monomer units present in a reaction mixture followed by polycondensation in the melt phase under temperature and vacuum to form an amorphous precursor that is then subject to solid-state polymerization to achieve final desired IV. Newer methods in which the polycondensation is carried out to form a finished product without solid state polymerization (e.g., direct to high IV) can also be used. Exemplary processes are described for example in U.S. Pat. Nos. 7,094,863; 7,129,317; 8,207,289; 7,786,247; 7,459,113; 8,022,168 and 8,557,950 each incorporated herein by reference in its entirety. In yet another aspect, the invention includes a catalyst system that contains one or more non-nucleating components in combination with one or more nucleating catalyst components that functions to facilitate the esterification, melt phase polymerization and or SSP of polyethylene terephthalate resins. Non-nucleating catalysts may include metals such as titanium and compounds thereof such as t-butyl titanate and/or titanium citrate. Other components of the non-nucleating catalyst may include aluminum compounds, lithium, cobalt, and other catalyst known in the art A typical nucleating catalyst component includes an antimony or germanium compound. Preferred are antimony compounds such as $Sb_2O_3$ and $SbC_6H_9O_6$ (antimony acetate), and other compounds that contain $Sb^{+3}$ atoms.

In one embodiment the catalyst composition may comprise, for example, an antimony component and a titanium component. Preferably both the antimony and titanium components are present in amounts such that the total amount of titanium and the total amount of antimony are less than the total amount of titanium that would be used in order to carry out polycondensing in the presence of only a titanium catalyst, and the total amount of antimony is less than the amount of antimony that would otherwise be used to carry out polycondensing in the presence of only the antimony catalyst. The PET resin therefore contains a reduced amount of antimony and a reduced amount of titanium in comparison to PET resins that are otherwise made by polycondensation processes that utilize only a titanium-based catalyst or only an antimony-based catalyst.

In another embodiment the catalyst contains no nucleating component and no antimony.

Preferably the Ti and Sb catalysts are used in a combined amount that provides polycondensation effectiveness that is equivalent to the polycondensation effectiveness (e.g., ability to maintain polymerization asset rate capability and control over the intrinsic viscosity of the polymer) that would otherwise be achieved when only a titanium catalyst or only an antimony catalyst is used. The weight ratio of the titanium component (or other non-nucleating component) and antimony catalyst (or other nucleating component) may range from 0.1:10 to 10:0.1 based on the total amount of titanium component and the total amount of antimony component, preferably 0.5:10 to 10:0.5, 1:10 to 10:1, 2:10 to 10:2, 3:10 to 10:3, 4:10 to 10:4, 5:10 to 10:5, 6:10 to 10:6, 7:10 to 10:7, 8:10 to 10:8, 9:10 to 10:9 or about 1:1. The amount of titanium (or other non-nucleating catalyst) and the amount of antimony are based on the amount of the elemental metal.

In a particularly preferred embodiment of the invention the antimony is present in a minor amount with respect to the amount of antimony that would otherwise be used if antimony were the only polycondensation catalyst present. For example, if only antimony is present in an amount of 200-300 ppm during polycondensation, a minor amount of antimony is an amount that is 50% by weight less, e.g., an amount of from 50 to 200 ppm preferably from 100 to 150 ppm or preferably less than 150 ppm, preferably less than 100 ppm. Likewise, a minor amount of titanium is an amount that is at least 50% less than the amount of titanium that would otherwise be used as a condensation catalyst for polycondensation carried out only in the presence of titanium. For example, if 10 ppm Ti is used as the only polycondensation catalyst, a minor amount of Ti is less than 5 ppm. In a preferable embodiment of the invention the polycondensation catalyst contains a minor amount of an antimony catalyst with titanium (or another non-nucleating catalyst) representing the balance of the total amount of catalyst necessary in order to achieve effective polycondensation.

The titanium catalyst is typically a titanate, such as titanium diisopropoxide bis(acetyl-acetonate) or tetrabutyl titanate. The antimony catalyst is typically antimony oxide ($Sb_2O_3$). Other catalysts include aluminum catalysts such as aluminum hydroxide and/or one or more aluminum alkoxides preferably used in combination with a lithium compound or an alkaline earth metal compound.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

In one aspect, this invention includes at least one polyester polymer preferably PET which comprises: (a) a dicarboxylic acid component comprising: (i) about 90 to about 100 mole % of terephthalic acid residues; (ii) about 0 to about 10 mole % of aromatic and/or aliphatic dicarboxylic acid residues having up to 20 carbon atoms; and (b) a glycol component comprising: (i) about 90 to about 100 mole % ethylene glycol residues; and (ii) 0 to about 10 mole % residues of at least one difunctional glycol chosen from 1,4-cyclohexanedimethanol, neopentyl glycol; and 2,2,4,4-tetramethyl-1,3-cyclobutanediol or mixtures thereof. The PET is preferably made by reacting and polycondensing a diacid and diol in the presence of the non-nucleating catalyst composition described herein.

In another aspect, the invention includes a polyethylene terephthalate resin that includes at least 2 parts per million (ppm)—and preferably less than 50 ppm—of elemental titanium and less than about 6 mole % comonomer substitution, preferably less than about 5 mole % comonomer substitution, less than about 4 mole % comonomer substitution, or less than about 3 mole % comonomer substitution and greater than about 1 mole % comonomer substitution, preferably greater than about 2 mole % comonomer substitution. This non-nucleator-catalyzed polyethylene terephthalate resin is especially useful in refillable containers and packaging.

It is known that a PET resin having a relatively higher comonomer substitution has a lesser tendency to crystallize, thereby improving clarity, heat-setting and thermal resistance such as a lower tendency to crystallize and form haze when exposed to hot-wash conditions. Thus, for resins used in making refillable bottles, the polyethylene terephthalate preferably includes between about 2 and 5 mole % comonomer substitution. For example, in one such embodiment the modified polyethylene terephthalate is composed of about a 1:1 molar ratio of (1) a diacid component of 2.5-4.5 mole %, preferably 3-4.0 mole % isophthalic acid with the remainder terephthalic acid, and (2) a diol component of 0.5-2.5 mole %, preferably 1.0-2.0 mole % cyclohexanedimethanol and the remainder ethylene glycol.

The diol component usually forms the majority of terminal ends of the polymer chains and so is present in the resulting polyester composition in slightly greater mole fractions. This is described by the phrases "about a 1:1 molar ratio of a terephthalate component and a diol component," "about a 1:1 molar ratio of a diacid component and a diol component," and "about a 1:1 molar ratio of the diester component and the diol component," each of which may be used to describe the polyester compositions of the present invention.

As used herein, the term "diol component" refers primarily to ethylene glycol, although other diols (e.g., diethylene glycol) may be used as well, and includes comonomers such as cyclohexyldimethanol.

The term "terephthalate component" broadly refers to diacids and diesters that can be used to prepare polyethylene terephthalate. In particular, the terephthalate component mostly includes terephthalic acid and/or dimethyl terephthalate, but can include diacid and diester comonomers as well. In other words, the "terephthalate component" is includes a "diacid component" and/or a "diester component."

The term "diacid component" refers somewhat more specifically to diacids (e.g., terephthalic acid) that can be used to prepare polyethylene terephthalate via direct esterification. The term "diacid component," however, is intended to embrace relatively minor amounts of diester comonomer (e.g., mostly terephthalic acid and one or more diacid modifiers, but optionally with some diester modifiers, too).

Similarly, the term "diester component" refers somewhat more specifically to diesters (e.g., dimethyl terephthalate) that can be used to prepare polyethylene terephthalate via ester exchange. The term "diester component," however, is intended to embrace relatively minor amounts of diacid comonomer (e.g., mostly dimethyl terephthalate and one or more diester modifiers, but optionally with some diacid modifiers, too).

Moreover, as used herein, the term "comonomer" is intended to include monomeric and oligomeric modifiers (e.g., polyethylene glycol).

The diol component can include other diols besides ethylene glycol (e.g., diethylene glycol, polyethylene glycol, 1,3-propanediol, 1,4-butanediol, 1,4-cyclohexane dimethanol, neopentyl glycol, and isosorbide), or the terephthalate component, in addition to terephthalic acid or its dialkyl ester (i.e., dimethyl terephthalate), can include modifiers such as isophthalic acid or its dialkyl ester (i.e., dimethyl isophthalate), 2,6-naphthalene dicarboxylic acid or its dialkyl ester (i.e., dimethyl 2,6 naphthalene dicarboxylate), adipic acid or its dialkyl ester (i.e., dimethyl adipate), succinic acid, its dialkyl ester (i.e., dimethyl succinate), or its anhydride (i.e., succinic anhydride), or one or more functional derivatives of terephthalic acid.

For the PET resins according to the present invention, isophthalic acid and 1,4-cyclohexane dimethanol are the preferred modifiers/comonomers. Those having ordinary skill in the art will appreciate that as a modifier, cyclohexane dimethanol efficiently suppresses polymer crystallinity.

It will be understood that diacid comonomer should be employed when the terephthalate component is mostly terephthalic acid (i.e., a diacid component), and diester comonomer should be employed when the terephthalate component is mostly dimethyl terephthalate (i.e., a diester component).

It will be further understood by those having ordinary skill in the art that to achieve the polyester composition of the present invention a molar excess of the diol component is reacted with the terephthalate component (i.e., the diol component is present in excess of stoichiometric proportions during the polycondensation).

Those having ordinary skill in the art will appreciate that most commercial polyethylene terephthalate polymers are, in fact, modified polyethylene terephthalate polyesters. Indeed, the polyethylene terephthalate resins described herein are preferably modified polyethylene terephthalate polyesters, e.g., modified polyethylene terephthalate polyesters that are not homopolymers but are instead copolymers that contain one or more dicarboxylic acid and/or diol comonomer components. In this regard, the modifiers in the terephthalate component and the diol component are typically randomly substituted in the resulting polyester composition.

As noted, the polyethylene terephthalate resins disclosed herein possesses low comonomer content. The polyethylene terephthalate generally includes less than about 6 mole % comonomer substitution, preferably the polyethylene terephtalate contains less than 5 mole %, 4 mole % or 3 mole % total comonomer (diacid+diol) substitution. Preferably the modified polyethylene terephthalate polyesters contain more than 0.5 mole %, 1 mole %, 1.5 mole % or 2 mole % comonomer substitution but less than 6 mole %.

The non-nucleator-catalyzed polyethylene terephthalate resin is preferably composed of about a 1:1 molar ratio of a diacid component and a diol component. The diacid component includes at least 94 mole %, preferably 96 mole %, 97 mole % terephthalic acid (e.g., terephthalic acid and isophthalic acid) and the diol component includes at least 95 mole %, preferably 96 mole %, 97 mole % or 98 mole % ethylene glycol (e.g., ethylene glycol and/or 1,4-cyclohexane dimethanol).

The non-nucleator-catalyzed polyethylene terephthalate resin according to the present invention generally possesses an intrinsic viscosity of less than about 0.90 dl/g, preferably 0.86 dl/g, 0.84 dl/g or 0.82 dl/g and preferably greater than about 0.60 dl/g, preferably 0.65 dl/g, 0.70 dl/g, 0.72 dl/g, 0.74 dl/g, 0.76 dl/g, or 0.78 dl/g wherein the inherent viscosity of the polyester is determined in 60/40 (wt/wt) phenol/tetrachloroethane at a concentration of 0.25 g/50 ml at 25° C. Those having ordinary skill in the art will appreciate, however, that during injection molding operations polyester resins tend to lose intrinsic viscosity (e.g., an intrinsic viscosity loss of about 0.02 to 0.06 dl/g from chip to preform).

As used herein, the term "intrinsic viscosity" is the ratio of the specific viscosity of a polymer solution of known concentration to the concentration of solute, extrapolated to zero concentration. Intrinsic viscosity, which is widely recognized as standard measurements of polymer characteristics, is directly proportional to average polymer molecular weight. See, e.g., Dictionary of Fiber and Textile Technology, Hoechst Celanese Corporation (1990); Tortora & Merkel, Fairchild's Dictionary of Textiles (7th Edition 1996).

Intrinsic viscosity can be measured and determined without undue experimentation by those of ordinary skill in this art. For the intrinsic viscosity values described herein, the intrinsic viscosity is determined by dissolving the copolyester in orthochlorophenol (OCP), measuring the relative viscosity of the solution using a Schott Autoviscometer (AVS Schott and AVS 500 Viscosystem), and then calculating the intrinsic viscosity based on the relative viscosity, see, e.g., Dictionary of Fiber and Textile Technology ("intrinsic viscosity").

In particular, a 0.25-gram sample (+/−0.005 g) of dried polymer sample is dissolved in about 50 ml (61.0-63.5 grams) of 60/40 (wt/wt) phenol/tetrachloroethane at a temperature of about 105° C. Chip samples are typically ground. After cooling to room temperature, the solution is placed in the viscometer at a controlled, constant temperature, (e.g., between about 20° C. and 25° C.), and the relative viscosity is measured. As noted, intrinsic viscosity is calculated from relative viscosity.

As noted in one embodiment, the non-nucleator-catalyzed polyethylene terephthalate resin typically includes between about 2 ppm and 50 ppm of elemental titanium. Preferably, the resin includes less than 25 ppm of elemental titanium (e.g., between about 2 and 20 ppm). More preferably, the resin includes at least about 5 ppm of elemental titanium or less than about 15 ppm of elemental titanium, or both (i.e., between about 5 and 15 ppm, such as about 10 ppm).

Those having ordinary skill in the art will further appreciate that the non-nucleator-catalyzed polyester resins described herein possess lower rates of crystallization as compared to conventional antimony-catalyzed polyester resins. The non-nucleator-catalyzed polyethylene terephthalate resins of the present invention thus possess lower crystallinity than otherwise identical antimony-catalyzed polyethylene terephthalate resins. Without being bound to a particular theory, it is believed that titanium and other non-antimony catalysts are poor nucleators as compared with antimony. Consequently, the non-nucleator-catalyzed polyethylene terephthalate resins of the present invention possess lower crystallization rates and a lower tendency to crystallize on exposure tp heat as compared with antimony-catalyzed polyesters.

Polymers with high crystallinity have a higher glass transition temperature Tg (e.g., Tg is about 67° C. for amorphous PET and about 81° C. for crystalline PET) and have higher modulus, toughness, stiffness, tensile strength, hardness and more resistance to solvents, but typically less impact strength.

Further, the non-nucleator-catalyzed polyethylene terephthalate resins typically include less than about 100 ppm of elemental antimony by weight, typically less than about 75 ppm of elemental antimony, and more typically less than about 50 ppm of elemental antimony. Preferably, the titanium-catalyzed polyethylene terephthalate resins include less than 25 ppm of elemental antimony and more preferably less than about 10 ppm of elemental antimony. In many instances, the non-nucleator-catalyzed polyethylene terephthalate resins are essentially free of elemental antimony. Antimony-free polyethylene terephthalate resins may be desirable because antimony is considered a heavy metal. In other instances, however, the non-nucleator-catalyzed polyethylene terephthalate resins include at least about 10 ppm, preferably 25 ppm, 50 ppm or 75 ppm of elemental antimony.

The polyethylene terephthalate resin also has a crystalline melting peak temperature ($T_M$) of at least about 240° C., typically at least about 245° C., and more typically at least about 250° C. Those having ordinary skill in the art will understand that the melting peak temperature point is largely dependent on comonomer content.

Moreover, at a cooling rate of 10° C. per minute as measured by differential scanning calorimetry, the polyethylene terephthalate resin has a cooling crystallization exotherm peak temperature ($T_{CC}$) of less than about 190° C. and typically less than about 185° C. In some instances, the polyethylene terephthalate resin has a cooling crystallization exotherm peak temperature ($T_{CC}$) of less than about 180° C.

The non-nucleator-catalyzed polyethylene terephthalate resin of the present invention possesses high clarity as compared with an otherwise identical antimony-catalyzed polyethylene terephthalate resin.

As measured in a step parison, the polyethylene terephthalate of the present invention typically possesses less than about 20% haze—preferably less than about 15 percent %—at a thickness of more than about 6 mm and less than about 5 percent % at a thickness of more than about 4 mm. Moreover, as measured in a step parison, the polyethylene terephthalate preferably possesses less than about 10 percent % at a thickness of more than about 4.5 mm, and sometimes at a thickness of more than 5.5 mm (e.g., less than about 10% haze at a thickness of between 4.5 and 6.0 mm). In some formulations, the polyethylene terephthalate possesses less than about 20% haze at a thickness of between 5.5 and 6.5 mm as measured in a step parison.

After solid state polymerization, the polyethylene terephthalate resins of the present invention possess an L* luminosity value of more than about 70, preferably more than about 75 (e.g., 77), and most preferably more than about 80 as classified in the CIE L*a*b* color space. In addition, the polyethylene terephthalate resin preferably possesses a b* color value of less than about 2, more preferably less than about 0, as classified by the CIE L*a*b* color space. Most preferably, the polyethylene terephthalate resin possesses a b* color value of between about −3 and 2 as classified by the CUE L*a*b* color space.

In addition, the polyester compositions and polymer blend compositions useful in the invention may also contain any amount of at least one additive, for example, from 0.01 to 25% by weight of the overall composition may be common additives such as colorants, toner(s), dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

In addition, certain agents which colorize the PET resin can be added to the melt. In one embodiment, a bluing toner (such as cobalt) is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The non-nucleator-catalyzed polyethylene terephthalate preforms and bottles possess excellent color (i.e., not too yellow) and preferably minimize the amount of titanium catalyst which may cause the polyethylene terephthalate resin to appear yellow. Color differences are commonly classified according to the L*a*b* color space of the Commission Internationale l'Eclairage (CTE). The three components of this system consist of L*, which describes luminosity on a scale of 0 100, a*, which describes the red-green axis (i.e., positive values are red and negative values are green), and b*, which describes the yellow-blue axis (i.e., positive values are yellow and negative values are blue).

Such color can be achieved, in one embodiment, by including between about 10 and 50 ppm of elemental cobalt, preferably between about 15 and 40 ppm of elemental cobalt, and most preferably between 20 and 30 ppm of elemental cobalt during the polyesterification and/or polycondensation. In the absence of cobalt, the polyethylene terephthalate resin of the mat take on a yellowish appearance. The process for making the PET forms a polyethylene terephthalate resin that possesses excellent color without the inclusion of colorants, apart from a cobalt catalyst.

Finally, though color can be measured in preforms and bottles, color is often more conveniently measured in the polyethylene terephthalate resins after solid state polymerization but prior to polymer processing (e.g., injection molding). In this regard, the L* luminosity values and b* color values reported herein relate to crystalline polyethylene terephthalate resins.

For polyester preforms that are capable of forming high-clarity, refillable bottles, e.g., carbonated soft drink bottles, according to the present invention, the polyethylene terephthalate generally has an intrinsic viscosity of less than about 0.90 dl/g, such as between about 0.68 dl/g and 0.84 dl/g. More typically, the polyethylene terephthalate has an intrinsic viscosity of more than about 0.70 dl/g and/or less than about 0.80 dl/g. The polyethylene terephthalate preferably has an intrinsic viscosity of from about 0.72 dl/g to about 0.78 dl/g. Most preferably, the polyethylene terephthalate has an intrinsic viscosity of from about 0.75 dl/g to about 0.78 dl/g. For preforms used to make refillable bottles, heat-setting performance diminishes at higher intrinsic viscosity levels and mechanical properties (e.g., stress cracking, drop impact, and creep) decrease at lower intrinsic viscosity levels (e.g., less than 0.6 dl/g).

In yet another aspect, the invention is a PET preform that is useful for forming refillable bottles that can withstand multiple hot-wash cycles. The PET preform possesses a heating crystallization exotherm peak temperature ($T_{CH}$) of more than about 140° C., an absorbance (A) of at least about 0.18 cm$^{-1}$ at a wavelength of 1100 nm or 1280 nm, and an L* luminosity value of more than about 70 as classified in the CIE L*a*b* color space. In yet another aspect, the invention is a PET preform that can be formed into a refillable high-clarity CSD bottle that has low shrinkage properties, excellent reheat characteristics and low haze.

The non-nucleator-catalyzed polyethylene terephthalate preforms and bottles possess excellent color (i.e., not too yellow) and preferably minimize the amount of titanium catalyst which may cause the polyethylene terephthalate resin to appear yellow. Color differences are commonly classified according to the L*a*b* color space of the Commission Internationale l'Eclairage (CIE). The three components of this system consist of L*, which describes luminosity on a scale of 0 100, a*, which describes the red-green axis (i.e., positive values are red and negative values are green), and b*, which describes the yellow-blue axis (i.e., positive values are yellow and negative values are blue).

Shown in FIG. 1 is example of a preform according to the present invention wherein preform 22 comprises distinctive zones each of which corresponds to a distinct area of the finished article. In the embodiment shown in FIG. 1, the preform comprises six distinct zones. Zone 51 is a finish-forming region, zone 52 is a shoulder-forming region, zone 53 is a barrel-forming region, zone 54 is a heel-forming region, and zone 55 is a base-forming region. Preform 22 is amorphous in that the PET polymer chains typically do not form lamellae, globules, or any other known molecular organization and, therefore, do not have a substantial amount of crystalline regions, if any at all.

The preform according to the present invention has a thickness ratio of the preform to the finished container made by blow molding the preform into a mold cavity. As used herein, the term "thickness ratio" is defined as the thickness in a zone of the preform responsible for forming a corresponding portion of the container to the thickness of the container in the zone correspondingly formed from the portion of the preform. Preferably, the thickness ratio is within the range between about 2.0 to about 7.5. In some embodiments, the thickness ratio is within the range between about 3.5 to about 7.0. In other embodiments, the thickness ratio is within the range between about 4.0 to about 6.0. Although the thickness ratio is dependent on the design geometry of the container and varies from one section of the container to another, it is also to a large extent, dependent on the intended application. For example, for refillable applications, the ratio is preferably between about 2.8 and about 6.4. For applications where both refillable and pasteurization operations will be employed, for example, the ratio is within the range between about 3.1 and about 4.7, more preferably between about 3.6 and about 4.9, and even more preferably between about 3.9 and about 5.2. In one preferred embodiment, for example, the shoulder and upper portion of a heat set container has a thickness ratio of between about 3.2 and about 3.8, more preferably between about 3.4 and about 4.2, and most preferably about 3.8 and about 4.6; the barrel portion of the container measured in the middle of the barrel preferably has a thickness ratio of between about 3.6 and about 4.3, more preferably between about 3.8 and about 4.5, and most preferably between about 4.0 and about 4.8; and the base portion preferably has a thickness ratio of between about 2.2 and about 2.5, more preferably between about 2.4 and about 2.8, and most preferably between about 2.7 and about 3.0.

The preform according to the present invention has a density ratio of the preform to the finished container. As used herein, the term "density ratio" is defined as the density of the finished article to the density of the amorphous preform. In some embodiments of the present invention, the density ratio is preferred to be within the range of between about 1.025 and about 1.049. In other embodiments of the present invention, the density ratio is preferred to be in the range of between about 1.035 and about 1.049. In still other embodiments of the present invention, the density ratio is preferred to be greater than about 1.049. Typically, the greater the density ratio the more enhanced thermal resistance exhibited by the resulting container.

In accordance with the present invention, the average hoop and axial stretch ratios of the preforms typically vary from about 3.0 to about 4.0, preferably about 3.2 to about 3.8 or about 3.5 for the hoop and from about 1.1 to about 1.5, preferably about 1.2 to about 1.4 or about 1.3. These values, however, are average values and zone-dependent based upon the size and geometry of the container as will be appreciated by those skilled in the art.

The preform has a weight of from 90 to 150 grams, preferably 100-140 grams, 110-130 grams, or about 120 grams. Preferably the preform has a thickness that is no greater than 6 mm at its thickest point, preferably no greater than 5 mm and preferably no greater than about 4 mm. Conventional refillable blow-molded PET bottles correspond generally with the following weights and sizes:

| Preform Weight | Bottle Volume |
| --- | --- |
| 90-110 g (e.g., 97 g) | 1.5 l |
| 110-135 g (e.g., 119 g) | 2.5 l |
| 135-150 g (e.g., 143 g) | 3 l |

In another embodiment of the invention the preform is a lightweight preform having a weight of from 35 to 90 grams, preferably from 45 to 80 grams, or 55 to 65 grams. Typically a two liter carbonated soft drink bottle made of PET is blow-molded from a 45 gram preform having a wall thickness that is about 4 mm. Lightweight 3 liter refillable PET containers may be formed from preforms having a preform weight of 50-75 gram, preferably about 60 gram with a wall thickness in the range of 4-5 mm.

Preforms that are relatively large and used for blow-molding refillable PET bottles having a large volume (e.g., 0.5-3 L) have a correspondingly high weight. Larger and heavier preforms (preforms that are more massive in structure) tend to have a greater susceptibility to undesirable crystallization due to heat retention after injection molding. Heat retained in the injection-molded preform may lead to undesirable crystallization, especially in PET resins that have no or low comonomer content. This tendency towards haze can be addressed by including a comonomer; however, at a cost of imparting a greater susceptibility to shrinkage in the blow-molded PET bottle. Additionally, the presence of nucleating catalyst residues in the PET resin used for making PET resins having a relatively low comonomer content tends to further contribute to a tendency to form haze.

The process of the present invention comprises the step of injecting a molten PET resin into a mold having a cavity to form a preform. Any injection-molding machine can be employed which is equipped with an injection plunger or a screw, reciprocating extrusion unit or continuously operating extrusion unit, and the polymer is injected into the injection mold through, for example, a nozzle, valve, sprue or gate. Then, the PET flows into the cavity of the injection mold where it is solidified into the preform article for stretch blow molding according to the present invention.

The process of the injection molding the preform may also comprise removing the molded preform while the preform is still hot and has a thermal gradient through and along the wall of the preform and transporting the hot preform to at least one conditioning station, preferably within 10 seconds after completion of injection molding. Preferably, the temperature of the preform as it is removed from the injection molding station is about from 75° C. to about 130° C., more preferably from about 80° C. to about 110° C., still more preferably from about 90° C. to about 105° C., and most preferably about 100° C.

In preferred embodiments of the present invention, the preform, while it is being transferred from the injection molding station to a blow molding station is "conditioned" by further modifying the temperature of select portions of the preform. Such temperature modification can include at least one conditioning station comprising a heating or cooling element. In preferred embodiments, the temperature of the performs are further modified by heating or cooling certain of the zones (i.e., portions) of the preform. For example, in one preferred embodiment of the present invention, at least one of the neck forming, barrel forming, heel forming, and base forming zones of the preform are further heated to achieve a temperature gradient in the specific areas of as much as about 20° C., more preferably as much as about 30° C., and most preferably as much as about 40° C. Without intending to be bound by any particular theory, it is believed that such selective conditioning promotes preferential orientation of the polymer during the blow molding process. Heat for the conditioning step may be applied by any means known to those skilled in the art such as, for example, hot air generated by a heat gun, infrared heaters, or combinations thereof. The preferred method for the conditioning step is employing a heat gun or a series of heat guns. In other embodiments, the conditioning step employs an infrared hater or a series of infrared heaters.

The process of the present invention optionally comprises the step of transporting the preform to a second conditioning station, preferably within about 10 seconds after the first conditioning step has been completed. When employed, the second conditioning step preferably heats and/or cools at least one of the neck forming, barrel forming and heel forming zones of the preform to ensure that the temperature gradient through the preform walls is as described above with respect to the first conditioning step.

Figure 2:
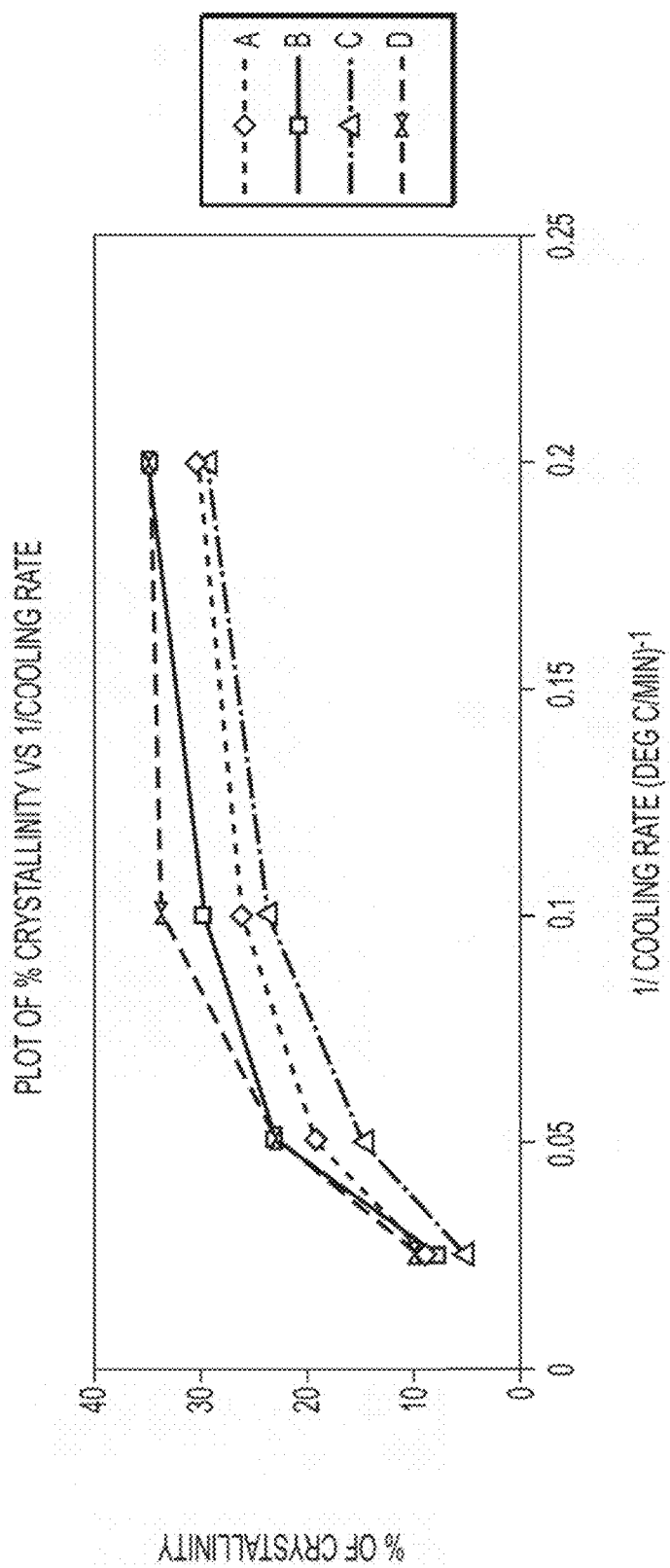
FIG. 2 describes the evolution of crystallinity as a function of cooling rate in a PET resin.

Cooling rate within the mold will affect the degree of crystallinity of the preform. FIG. 2 describes the crystallinity evolution as a function of cooling rate of an injection-molded part. The horizontal axis moving from left to right represents the inverse of the cooling rate described in ° C./min. As such, slower cooling rates are towards the right of the chart in FIG. 2. It is evident that slower cooling leads to the formation of PET having a higher degree of crystallinity. As mentioned herein, conventional heat set hot-filled PET containers include substantial amounts of crystallinity (e.g., greater than 30%) but are unable to provide refillable PET containers having container walls with dispersed areas of crystallinity such that low crystallinity is achieved at a relatively low comonomer content and in the at least partial absence of a nucleating catalyst.

In a preferable embodiment of the invention the preform is formed under "warm set" conditions. Conventionally preforms have been made under "heat set" or "cold set" conditions. Heat set conditions maintain a high temperature of a preform for an extended period of time resulting in increased crystallization. Cold set forming preferably produces a preform having amorphous characteristics. Warm set conditions provide a desirable balance of crystallinity and amorphous properties such that domains of crystallinity are interspersed within a matrix of amorphous resin or, amorphous domains are dispersed within a matrix of mainly crystalline PET resin.

In a preferred embodiment of the invention the champagne base is directly blow-molded into the form of the bottle. Direct integration of the base into the bottle avoids the unnecessary use of PET resin that might otherwise be required if a two layer structure is utilized wherein the base portion is a separate cap which is separately attached to a blow-molded bottle having a spherical or semi-spherical bottom.

In another embodiment, the present invention includes a process for forming a blow molded refillable PET container having improved resistance to hot washing. The process includes: injecting a molten PET resin into an injection mold cavity to form a preform; removing the preform at a temperature below the glass transition temperature of the resin, preferably while the preform is at a temperature of from about 75° C. to about 130° C., preferably from about 80° C. to about 110° C., from about 85° C. to about 90° C.; optionally conditioning the preform by selectively heating at least one portion of the preform selected from the group consisting of: neck forming portion, barrel forming portion, base forming portion, and heel forming portion; inserting the conditioned preform into a blow mold having walls that define a blow cavity that defines a shape of a finished article, wherein the mold preferably has a plurality of temperature zones along an axis of the mold all of which are above the glass transition temperature of PET; blowing the preform into a finished PET container by a stretch blow molding.

The blow molding step may include: inserting a blow rod into the conditioned preform; optionally injecting low pressure gas into the conditioned preform at a pressure of from about 100 psi to about 200 psi to form a pre-blown preform; optionally injecting high pressure air at a pressure of from about 400 psi to 600 psi into the pre-blown preform to expand the pre-blown preform against the mold walls to form the finished container; optionally holding the finished container in the mold for a time period of from about 2 seconds to about 20 seconds; releasing the finished container from the mold wherein the temperature of the finished container is from about 80° C. to about 125° C.; and allowing the finished container to cool to ambient temperature.

In yet another aspect, the present invention provides a blow-molded refillable PET container, preferably a CSD container, comprising a wall having a density of between about 1.370 g/cc and 1.385 g/cc, a heat-induced crystallinity of from about 18% to about 25%, and a strain-induced crystallinity of from about 55% to about 75%, wherein the PET container, when filled with a liquid having a temperature of from about 100° C. to about 135° C., will not experience a change in volume of greater than about 5%, preferably no greater than 3% while maintaining excellent transparency.

In a preferred embodiment of the invention, the containers are injection molded using an integrated system where all molding and conditioning steps described herein are conducted in line with no significant interruptions. As used herein, the term "integrated system" refers to a system where the refillable PET containers of the present invention are made by an apparatus having an injection molding station for making preforms and at least one blow molding station for blowing the preform into a finished article. Thus, when using an integrated system preforms are made by conventional injection molding and then, while still hot, are transported to a blowing station on the same platform. In an integrated system the preform does not have to be reheated to a preferred orientation temperature from ambient temperature as is typically required for non-integrated systems. Accordingly, the preform of an integrated system will typically have a single heat history unlike a preform that is formed, cooled and then reheated to the desired orientation temperature and, therefore, has multiple heat histories.

Preforms made and treated on an integrated system typically have a minimum thermal gradient across the wall and preferably also have a thermal gradient along the preform body. These thermal gradients aid in achieving controlled preferential orientation of desired sections of the finished article that translates into improved thermal resistance properties of the finished container.

In another embodiment of the invention the refillable PET containers are injection molded using an apparatus or system that includes a reheating step. First an apparatus having an injection molding station for making preforms is used to make a preform. The preform is at least partially cooled, e.g., cooled by at least 5° C., 10° C., 20° C., 30° C. or at least 50° C. measured in comparison to the wall temperature of the preform immediately after injection molding is complete. The cooled preform is subsequently conveyed to a blow molding station for blowing the preform into a refillable PET bottle. Prior to blow molding the preform is reheated to a temperature above the glass transition temperature of the PET resin. Reheating is accomplished by conventional techniques such by exposing the preform to infrared heat. Preferably the PET resin contains a reheat additive to aid in heat capture and quick temperature elevation.

During blow molding the preform is disposed within a blow mold cavity having a mold temperature measured by the heat transfer medium used to heat the mold that is higher than the glass transition temperature ("Tg") of PET resin. Preferably, the temperature of the mold is at least from about 75° C., preferably less than 100° C., more preferably between from about 80° C. to about 90° C., still more preferably between from about 82° C. to about 88° C., and most preferably about 82° C. The wall of the mold defines a blow cavity having a volume for receiving a PET preform and blowing the preform into an expanded PET article against the mold cavity wall.

Once in the mold, a stretch blow molding process is employed to form the container of the present invention. In preferred embodiments, the stretch blow molding process of the present invention comprises a pre-blow step immediately followed by a blowing step.

During the pre-blow process, an elongated rod is inserted into the mold cavity of the heated preform and blows a "puff" of pressurized air into the preform at a relatively lower pressure of from about 100 psi to about 200 psi and, preferably about 150 psi. In this pre-blow process, the air is preferably added simultaneously as the rod provides a downward pressure thereby stretching the preform to a base portion of the mold and outward under the low air pressure. Immediately after the pre-blow process, high pressure air at from about 400 psi to about 600 psi is injected into the container through the rod to press an outer surface of the preform into contact with an inner surface of the mold cavity to form the container.

Preferably, in the single blow molding step, the temperature of the PET container is from about 70° C. to about 95° C. and more preferably from about 75° C. to about 90° C. when it is released from the mold. In this temperature range the container will be hot enough to undergo strain induced orientation.

The present invention provides a blow-molded PET container comprising a wall having a density of between about 1.370 g/cc and 1.385 g/cc, a heat-induced crystallinity of from about 18% to about 25%, and a strain-induced crystallinity of from about 25% to about 45%, wherein the refillable PET container, when washed or contacted with a liquid having a temperature of from about 100° C. to about 135° C., will preferably not experience a change in volume of greater than 3% and/or a change crystallinity of more than 3%. A blow molded bottle is shown as FIG. 3.

In a related aspect, the invention is a high-clarity, carbonated soft drink bottle formed from the preform. The carbonated soft drink bottle is capable of withstanding internal pressures of about 60 psig. The blow-molded refillable PET container preferably has an internal volume of 0.5-3 liter, preferably 1-2.5 liter or 1.5-2 liter.

The refillable PET container preferably has a cylindrical structure with a flat bottom and a tapered top leading to an opening, spout or mouth. Typically the flat bottom or structured bottom portion of the refillable PET container (bottle) has a thickness that is greater than the thickness of the cylindrical walls of the refillable PET bottle. Preferably the thickness of the bottom portion is at least two times, preferably at least 3, 4, 5, 6, 7, or 8 times the thickness of the vertical walls of the refillable PET bottle, alternately at least 1.5 or 1.25 times the thickness of the vertical walls of the cylindrical portion of the refillable PET bottle. The mouth of the refillable PET bottle is substantially smaller than the circumference of the refillable PET bottle at its widest point. Preferably the mouth, spout or opening has a diameter that is from 0.05 to 0.5 times the diameter of the widest portion of the cylindrical portion of the refillable PET bottle, preferably from 0.1 to 0.4, more preferably 0.2-0.3 times the diameter of the widest portion of the cylindrical portion of the refillable PET bottle. A conical or tapering top portion of the refillable PET bottle leads to the mouth, opening or spout such that the natural resting position of the PET bottle is on the bottom flat, corrugated or otherwise structured bottom portion.

Figure 3:
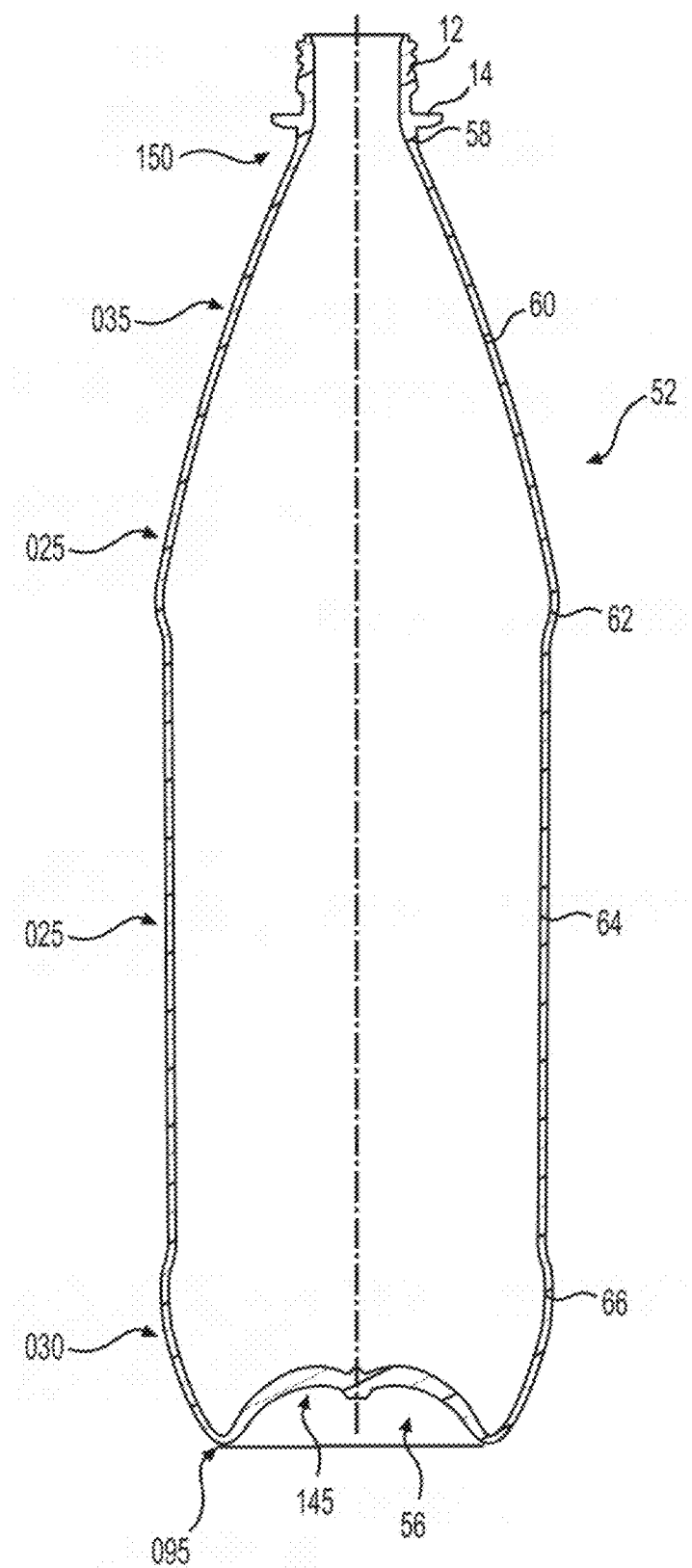
FIG. 3 shows the structure of a blow-molded bottle according to one embodiment of the invention.

FIG. 3 shows an embodiment of the blow-molded PET bottle of the present disclosure. The bottle (52) has a base (56) which is generally has an inwardly curving portion of the bottle similar to the punt of a wine bottle. The base typically has a wall thickness that is greater than the wall thickness of other portions of the PET bottle such as the panel (64). The base is connected to a transition area (66) in which the wall thickness narrows from the thickest portion of the base (56). The transition portion is connected to the panel portion (64) which is typically a tubular section having a circular cross-section. The panel section (64) transitions to the body section (62) which has a wall portion (60) leading to the top or closure end of the PET bottle. The closure end includes a threaded neck (12) that is used to accommodate a counter threaded closing device that seals a beverage or liquid in the PET bottle. A support flange (14) is present below the threaded neck and transitions to a shoulder portion (58). The top portion of the bottle including the threaded neck (12), the support flange (14) and the shoulder portion (58) are all of substantially thicker dimension that the wall thickness of a panel (64).

In other embodiments of the invention the refillable PET bottle may have a square, rectangular or otherwise rhombohedral structure. Preferably refillable PET bottles that do not have a cylindrical body portion are supported by one or more exterior frames that function to give mechanical support to the refillable PET bottle.

In a preferable embodiment of the invention the blow-molded refillable PET container has a modified standing ring. The standing ring is a circular ring at the base of the bottle which provides a contact surface for direct contact with a shelf or display surface. The standing ring is the resting surface of the refillable PET bottle during storage and stowage.

The standing ring preferably has a "champagne base" (see FIG. 4) rather than the petaloid base used in conventional CSD bottles that are typically not utilized for refillable applications (FIG. 5). In contrast to a pentaloid base having identifiable and oriented feet, a champagne base is a thick amorphous polymer portion of the refillable PET bottle that has greater resistance to multiple hot-wash cycles and less resistance to crystallization (due in part, for example, to the absence of a nucleating catalyst residue). On the other hand, the blow-molded refillable bottle of the present disclosure has a champagne base with a less resistance to stretching, thus improving its performance in blow-molded refillable PET bottle applications. The decreased resistance to stretching is due, in part, to the decreased comonomer content of the PET resin. Conventional heat-set and hot-fill PET bottles that have a relatively greater comonomer concentration have a greater resistance to stretch which makes it difficult to control material distribution of the PET resin during blow molding. This in turn results in significant bottle-to-bottle variation in thickness and material distribution in conventional blow-molded bottles. This in turn leads to a greater tendency for physical deterioration of PET blow-molded bottles formed from conventional PET resins.

FIG. 4A demonstrates how the thicknesses of different portions of the bottle base compare to thickness of sidewall portions of the bottle. In FIG. 4A the bottle under different pressure and filling conditions is shown in a side view with the right hand portion showing the inner surface of the bottle profile 24A under pressurized conditions. Outer surface profiles represented by 24C and 24B are also shown. FIG. 4B provides a further side view of a champagne base identifying important contact points such as 127 which is the point at which the base contacts a supporting surface such as a store shelf surface. Stability at point 127 is critical in order to resist abrasive forces and provide sufficient physical strength to avoid bottle collapse or denting at the base. The center line is shown as 132 with an interior spur point 131 and an exterior spur point 129. The sidewall representing a visible outside surface of the champagne base extends from the contact point 127 to form a wing including a transitional thickness 125 and high level thickness 126.

Figure 4C:
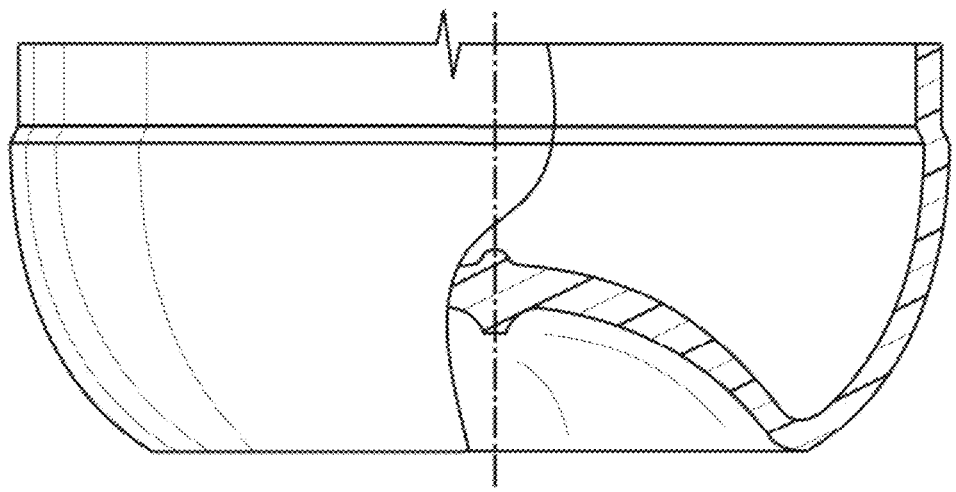
FIG. 4C shows a champagne base structure of a refillable PET container.
Figure 4D:
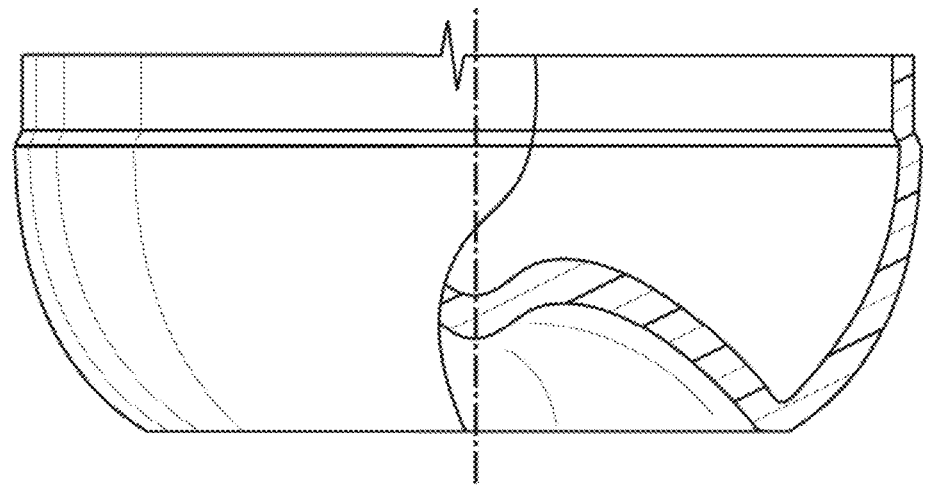
FIG. 4D shows a champagne base structure of a refillable PET container.

FIGS. 4C and 4D describe additional embodiments of a champagne base showing both the outer visible surface and the supporting arch portion and contact portion of the champagne base structure. FIGS. 4C and 4D represent embodiments of the invention in which the champagne base may be covered by a separate base portion thus making the structural features of the champagne base non-visible to a consumer.

Figure 5A:
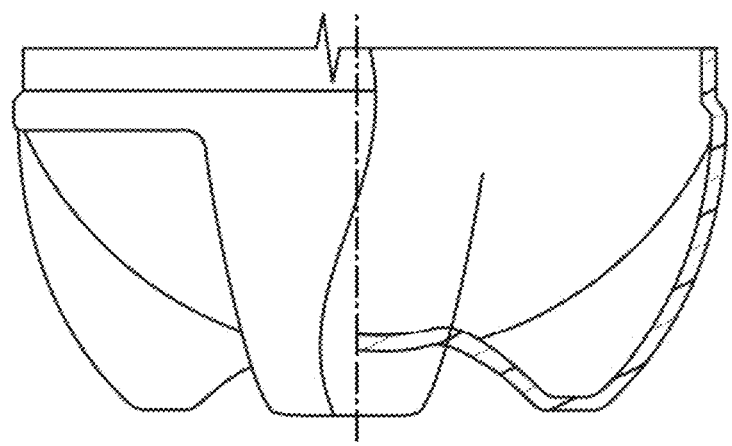
FIG. 5A shows a conventional base structure of carbonated soft drink bottle.

FIG. 5A shows a combined interior and exterior view of a petaloid base. The petaloid base may separately represent a cup that supports a blow-molded bottle having a smooth and semi-spherical outer surface (501). The petaloid base may support the blow-molded bottle at contact points around edges of the base (501) and at an apex bottom portion (502). The petaloid base otherwise has a plurality of foot portions (504) which separately contact a support surface such as a store shelf surface. In contrast to a champagne base the contact may be at a plurality of points (e.g., the petaloid base may have 3-7 "feet" or contact points, preferably 5 "feet", and thus has lower overall contact surface corresponding with the contact surface 127 for the champagne base described in FIGS. 4A-4D.

Figure 5B:
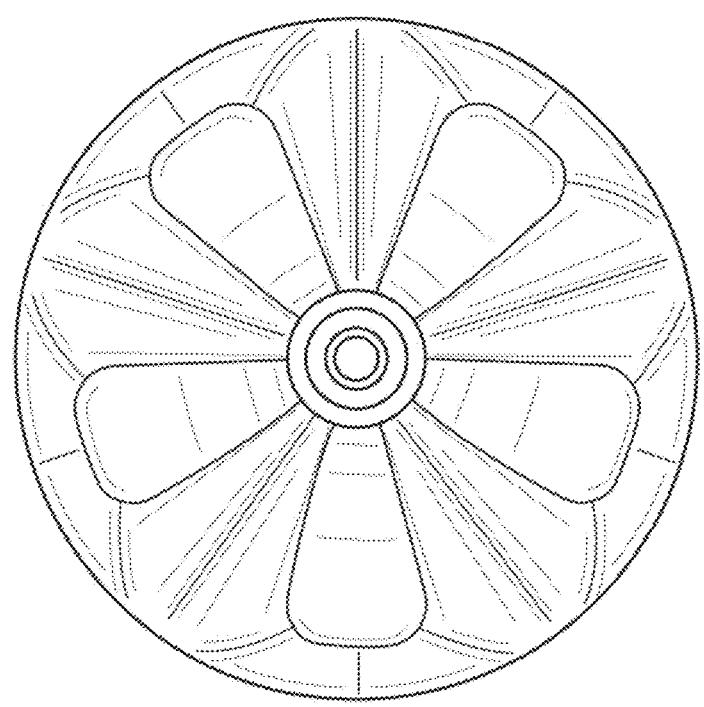
FIG. 5B shows a conventional base structure of carbonated soft drink bottle.
Figure 5C:
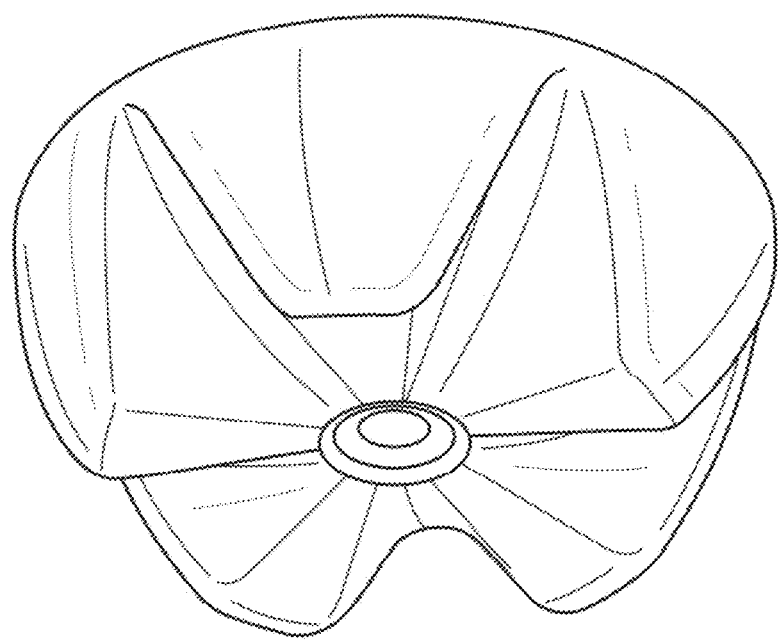
FIG. 5C shows a conventional base structure of carbonated soft drink bottle.

FIG. 5B shows a bottom view of a petaloid base showing 5 feet with contact points and generally describing the exterior topography of the base. The exterior topography is also shown in FIG. 5C at an oblique angle.

Figure 5D:
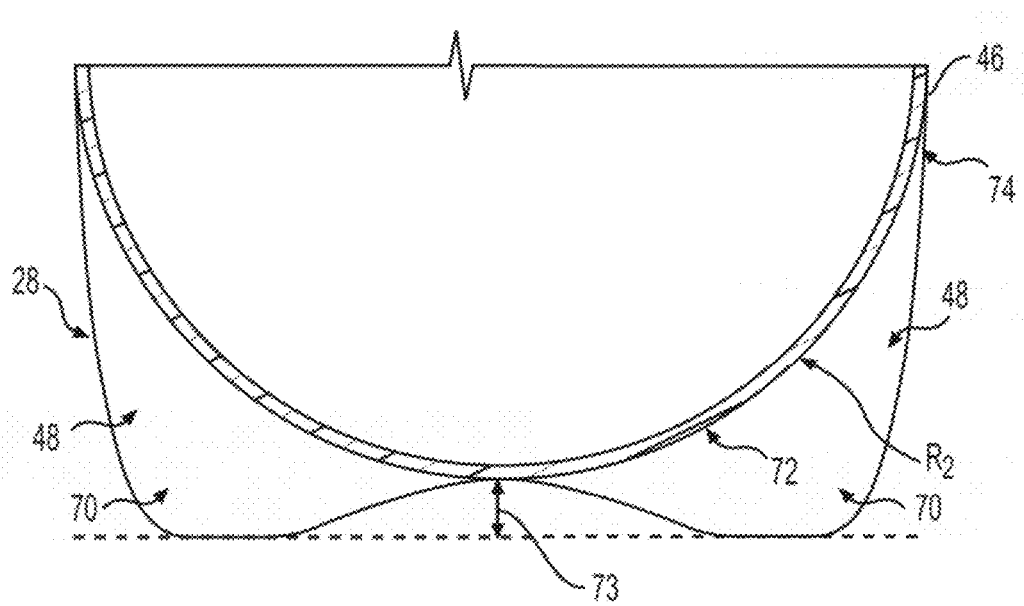
FIG. 5D shows a conventional base structure of carbonated soft drink bottle.

FIG. 5D further shows the petaloid base mated with a blow-molded refillable PET bottle. The exterior surface of the refillable PET bottle may be in contact with portions of the petaloid base such as the feet portions 48 at one or more points of the exterior surface of the bottom of the blow-molded bottle such as 46 and 72. Feet are shown as an exterior profile (70) at different portions such as intermediate 48 and upper 28.

Figure 5E:
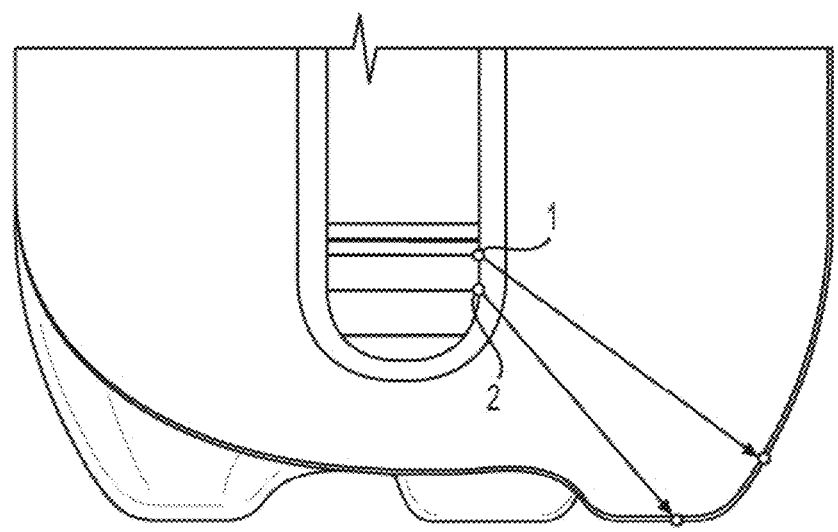
FIG. 5E shows a conventional base structure of carbonated soft drink bottle.
Figure 5F:
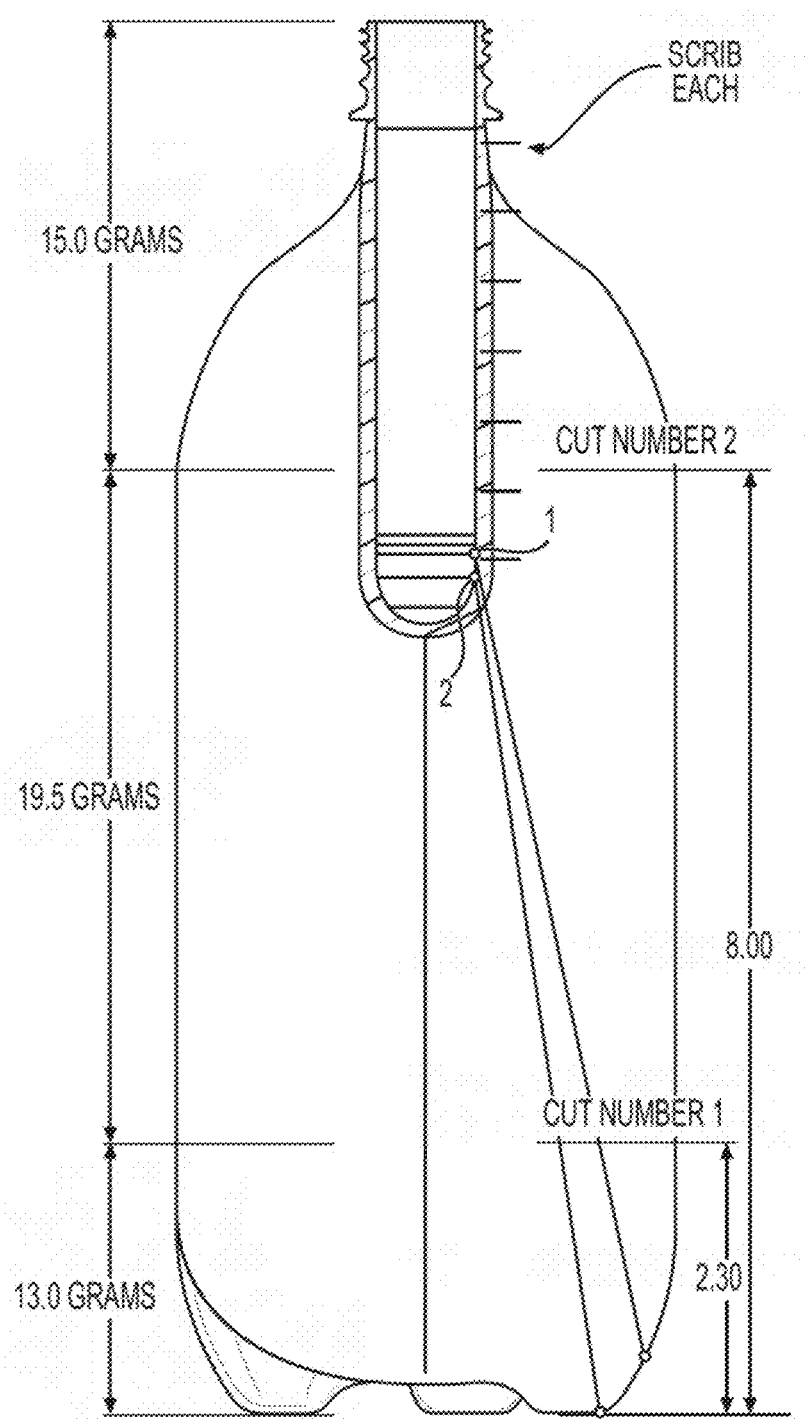
FIG. 5F shows a conventional base structure of carbonated soft drink bottle.

FIG. 5E correlates portions of the preform from which the refillable PET bottle is formed as a single piece by blow-molding into a mold which includes a shape corresponding with a petaloid base. Different portions of the preform correspond with different portions of the refillable PET bottle having distinct and different thicknesses (1) and (2). FIG. 5F shows a refillable PET bottle that is direct blow-molded with a petaloid base and shows the preform portions matched to corresponding positions of the blow-molded bottle.

The champagne and petaloid bases differ substantially in both physical structure visible to the naked eye and microstructure of the PET matrix. The champagne base has contact portions (see 127 in FIG. 4) that are mostly amorphous, preferably at least 60%, 70%, 80%, or at least 90% amorphous PET resin. The amorphous form of the PET resin at the contact point provides resistance to volume change that is important for refillable PET bottle applications. In contrast, the contact points of a petaloid base may be mostly crystalline PET material, preferably at least 60%, crystalline, 70%, 80% or preferably at least 90% crystalline PET resin. The petaloid base imparts significant strength to the PET bottle design from the pressure of carbonation within a carbonated soft drink bottle. The petaloid base is, however, unable to provide the improved resistance to volume change that is demonstrated by the champagne base and relatively thick portions of an amorphous resin at the contact points (127 in FIG. 4).

Figure 6:
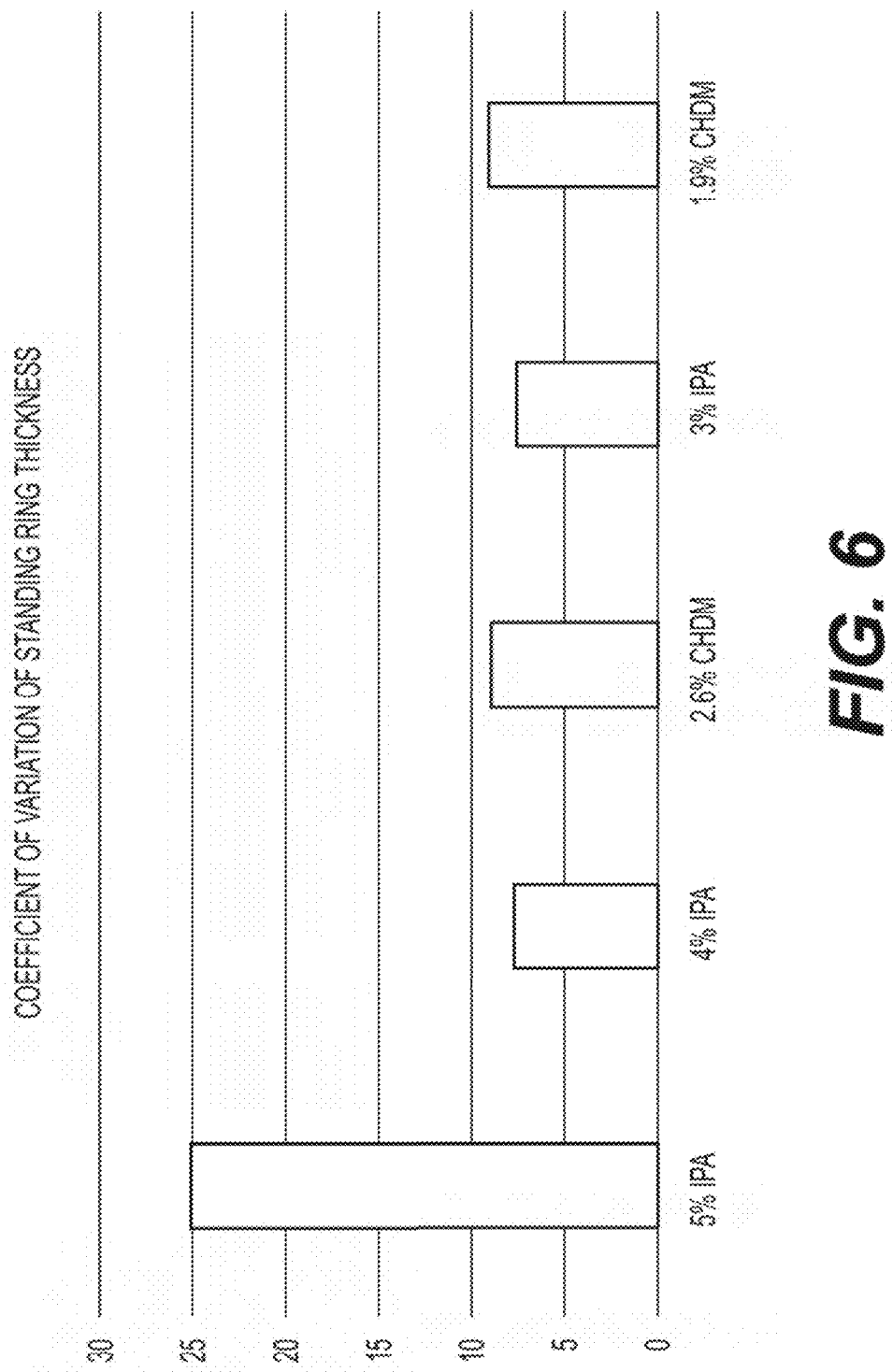
FIG. 6 shows the coefficient of variation in standing ring thickness of blow-molded refillable PET bottles.

The improvement obtained by using the PET resin of the present disclosure is seen in a reduction in dimensional variation of the standing ring of the refillable bottle, see for example FIG. 6. The conventional resin on the left of the chart (FIG. 6) includes 5% IPA comonomer and has a substantially greater coefficient of variation in the standing ring thickness in comparison to inventive PET resins used for making the refillable PET bottle of the present disclosure which contain lesser amounts of IPA or other comonomer such as CHDM. The vertical axis of FIG. 6 is the coefficient of variation representing the ratio of the standard deviation to the mean. This is the variation of the thickness of the standing ring within the base of a single bottle. Greater variation leads to areas of greater and lesser thickness which in turn leads to bottle failures.

Figure 7A:
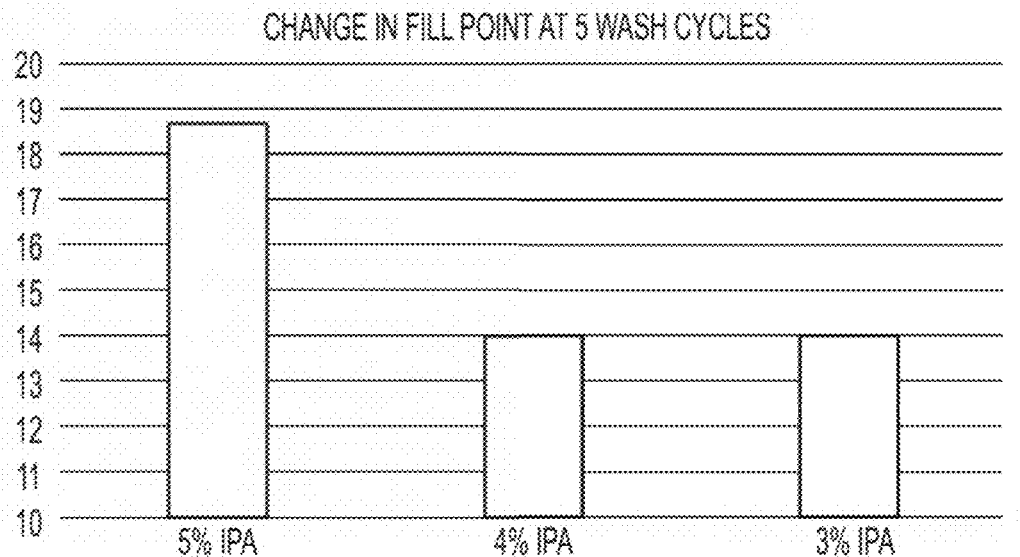
FIG. 7A shows the change in fill point volume after exposure to 5 wash cycles in refillable blow-molded PET bottles.
Figure 7B:
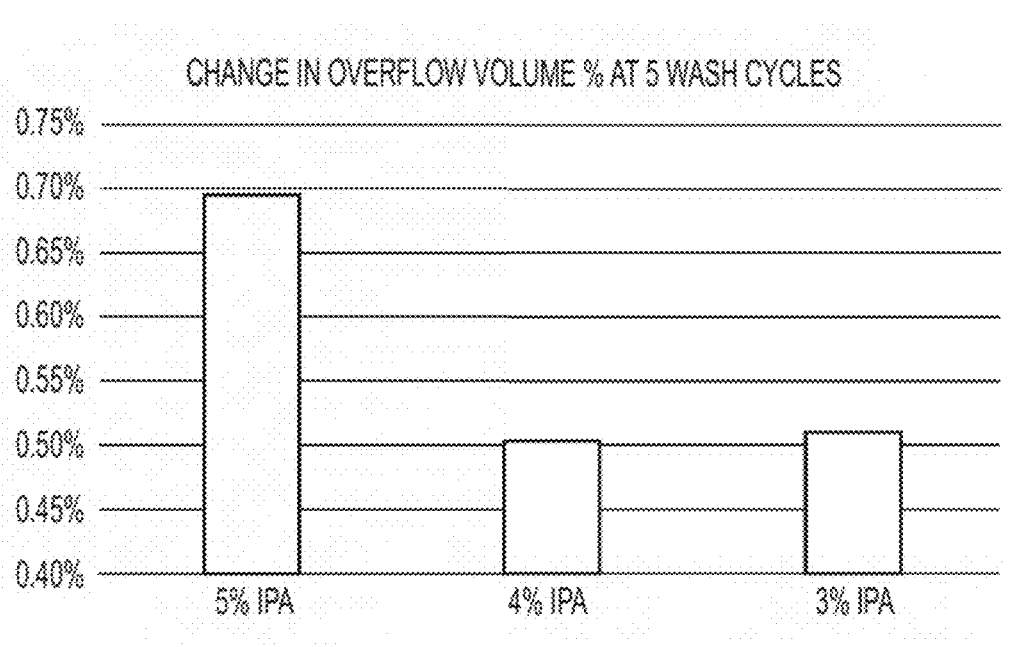
FIG. 7B shows the change in overflow volume after exposure to 5 wash cycles as a change in bottle volume in % based on the pre-wash volume for a bottle made from an IPA-containing resin.
Figure 7C:
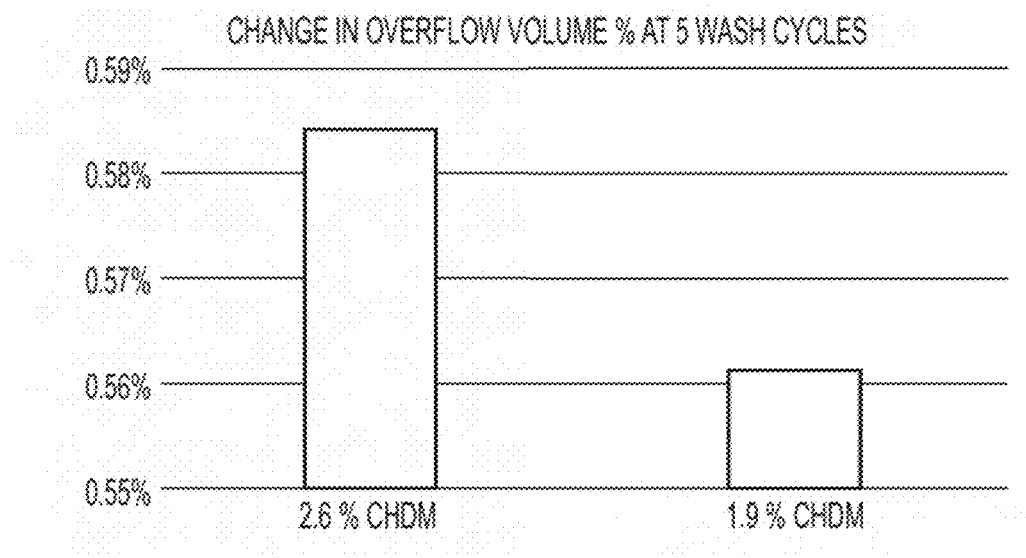
FIG. 7C shows the change in overflow volume after exposure to 5 wash cycles as a change in bottle volume in % based on the pre-wash volume for a bottle made from a CHDM-containing resin.

The reduction in comonomer also improves the bottle stability during and after hot-washing. The change in volume from shrinkage during the wash process improves with decreasing concentrations of comonomer. The reduction in the fill point changes improves the bottle quality in the marketplace and in the washing process. The 'fill point' is the typical liquid level in the bottle of a specific size. A decrease in fill point represents a drop in level due to expansion of the bottle (stretching), while an increase in fill point represents shrinkage in the bottle. FIG. 7 shows describes the change in fill point in milliliters (vertical axis). Changes in fill point volume point are a proxy or objective measurement for the dimensional stability of a bottle. A relatively higher change in fill point volume is indicative of a bottle or bottle design having a weak point.

The morphology of the PET resin forming the walls of a preform and/or a bottle may have different phases such as an amorphous, amorphous oriented and a crystalline phase. The amorphous phase includes mainly a molecularly unordered, sporadic or chaotic arrangement of PET molecules that is at least partially free of crystallization and/or ordered molecules. In the solid state the molecular motion of the amorphous phase is restricted to very short range vibrations and rotations. In the molten state there is considerable segmental motion arising from rotation about chemical bonds. The amorphous oriented phase contains polymer chains somewhat aligned to the direction of the stress without being incorporated into a crystalline arrangement. As a crystalline phase, the PET polymer chains arrange themselves in an orderly alignment. Crystalline portions of solid state PET molecules can extend straight in one direction and then fold back and forth numerous times to form a folded structure. Numerous such folded structures can stack to form more complex structures known as lamellae. Further crystallized, the lamellae can form globules. A consequence of greater crystallization is haze or opacity.

Strain-induced crystallization can be used to increase the crystalline fraction of PET. Strain-induced crystallization requires stretching of the PET under proper heat and extension ratios to orient the PET molecules into an organized matrix. Strain-induced crystallization occurs for example when a preform (i.e., a test tube shaped article) is blown into a mold of greater volume to cause stretching of the preform in one or more directions. Conventional PET containers can be imparted with thermal crystallinity by exposure to heat in a process known as heat setting or thermal annealing. In this process, the energy transferred from the hot molds to the bottle sidewall allows for relaxation of amorphous oriented chains resulting in resistance to deformation when filled and increased crystallinity by incorporation of amorphous domains or thickening of existing crystals. Under some conditions such as development of heat-induced lamellae and globules orientation of the polymer chains creates a condition where crystal formation is kinetically favorable upon application of thermal energy. In strain-induced crystallization domain sizes of the crystalline portions of the polymer matrix forming an article remain small enough for optical transparency to be maintained.

Conventional heat-setting processes include blowing a PET resin into a mold that is held at a temperature of 120-130° C. for up to 3 seconds. Containers produced with this method show crystallinity values of around 30%, and may be used for hot-fill applications at temperatures up to 85° C. Another conventional method requires a substantially higher mold temperature, e.g., up to 250° C. that achieves significantly greater crystallinity (as high as 60%). Such higher levels of crystallinity are useful for forming containers having improved physical properties such as resilience.

Double blow processes are also used for imparting crystallinity to containers. This includes the use of two molds, one that is used to form an intermediate that is larger than the final container, and one to form the final container. Crystallization occurs in an intermediate step whereby the intermediate shape is heated in a shrink oven, generally in the absence of shrinking resisting stress to form containers having crystallization levels of 40-45%.

Greater levels of crystallinity are favorable for hot-filled PET bottles in which the PET matrix that forms the walls of the container has a higher glass transition temperature than amorphous PET. This in turn permits the bottle to be filled with a liquid at a temperature that is higher than the temperature that would be permitted for amorphous resins. Although hot-fill bottles are resistant to an initial fill of hot fluid, multiple heat cycles reduce the strength of the bottles walls especially in portions of the bottle that are relatively thick such as the foot or base. This tendency to loose resilience after multiple exposures to hot-wash cycles and thus be subject to an increased risk of failure disqualifies conventional heat-set hot-fill PET bottles from practical application as refillable PET containers. In order to be acceptable for refillable PET bottle applications that are subject to multiple hot-wash cycles, the bottle must be resistant to changes in crystallinity and physical properties during the hot-wash cycle.

For applications such as blow molding in which the PET resin is intended for packaging (e.g., polyester preforms and bottles), the PET resin preferably includes a heat-up rate additive. In this regard, a heat-up rate additive (such as carbon black and/or TiN particles) is present in the resin in an amount sufficient to improve the resin's reheating profile. As will be understood by those having ordinary skill in the art, a heat-up rate additive helps preforms absorb energy during the preform reheating processes. When reheating preforms, the inside of the preform should be at least as warm as the outside of the preform as the inside undergoes more stretching during blow molding.

Slow-crystallizing polyethylene terephthalate resins possess a higher heating crystallization exotherm peak temperature ($T_{CH}$) as compared with those of antimony-catalyzed polyethylene terephthalate resins. The objective of the heat-setting process is to maximize bottle crystallinity and stress relaxation while maintaining clarity. It would seem that a slower crystallizing resin would have inferior heat-setting capability. Consequently, including a heat-up rate additive to achieve higher preform temperatures—and thus promoting crystallinity in the slower crystallizing resin—would seem to be of no practical benefit. Under such circumstances, those having ordinary skill in the art would not expect to achieve improved bottle properties (e.g., clarity and shrinkage).

For example, a bottle preform made from a slow-crystallizing polyethylene terephthalate resin (e.g., the titanium-catalyzed polyester resins herein disclosed) that further includes a heat-up rate additive. As noted, compared with antimony, titanium slows the onset of thermal crystallization in the preform as the preform is heated. The heat-up rate additive, however, causes the preform to absorb more energy and, therefore, to reach significantly higher temperatures before the onset of crystallization. Thus, good preform clarity is maintained even at elevated preform temperatures.

Optionally, one or more heat-up rate additives may be added to modify a slow-crystallizing polyester resin to enhance the resin's reheating profile actual improves blow molding performance and bottle properties, such as shrinkage. The increased preform temperature in the blow molding and heat-setting processes promotes bottle crystallization and stress relaxation while producing bottles having clarity superior to those of antimony-catalyzed polyethylene terephthalate resins.

In one embodiment, a heat-up rate additive is included in the PET resin, for example a carbon-based heat-up rate additive. Carbon-based heat-up rate additive is typically present in the polyethylene terephthalate resin in an amount less than about 25 ppm. More preferably, carbon-based heat-up rate additive is present in the polyethylene terephthalate resin in an amount between about 4 and 16 ppm (e.g., 8 12 ppm), most preferably in an amount between about 6 and 10 ppm. Suitable carbon-based additives include carbon black, activated carbon, and graphite. For example, satisfactory carbon black heat-up rate additives are disclosed in U.S. Pat. No. 4,408,004 (Pengilly), which is hereby incorporated herein by reference in its entirety.

In another embodiment, the heat-up rate additive is a metal-containing heat-up rate additive. Metal-containing heat-up rate additive is typically present in the polyethylene terephthalate resin in an amount between about 10 and 300 ppm, more typically in an amount greater than about 75 ppm (e.g., between about 150 and 250 ppm). Suitable metal containing heat-up rate additives include metals, metal oxides, minerals (e.g., copper chromite spinels), and dyes. For example, satisfactory inorganic black pigments and particles are disclosed in U.S. Pat. No. 6,503,586 (Wu), which is hereby incorporated herein by reference in its entirety. General methods of using heat up additives and their application in the production of blow molded bottles is described in US 2013/0183467 incorporated herein by reference in its entirety.

Preferred metal-containing heat-up rate additives are tungsten-based additives, such as tungsten metal or tungsten carbide. In this regard, tungsten-containing heat-up rate additive powders preferably have an average particle size of between about 0.7 and 5.0 microns, more preferably between about 0.9 and 2.0 microns.

As will be understood by those familiar with this art, particle size is typically measured by techniques based on light scattering. Particle sizes and distributions are often characterized according to ASTM B330-2 ("Standard Test Method for Fisher Number of Metal Powders and Related Compounds").

Other preferred metal-containing heat-up rate additives are molybdenum-based additives, especially molybdenum sulfide ($MoS_2$). In this regard, molybdenum sulfide has outstanding heat absorption properties, so it can be included in somewhat lesser quantities (e.g., 5-100 ppm) as compared with other metal-containing heat-up rate additives.

Other heat-up rate additives are natural spinels and synthetic spinels. Spinels are preferably included in the polyethylene terephthalate resin in an amount between about 10 and 100 ppm (e.g., between about 15 and 25 ppm). Particularly outstanding spinel pigments are copper chromite black spinel and chrome iron nickel black spinel.

In polyethylene terephthalate bottle production, polyethylene terephthalate bottle preforms are reheated by passing the preforms through a reheat oven of a blow molding machine. The reheat oven consists of a bank of quartz lamps (3,000 and 2,500 watt lamps) that emit radiation mostly in the infrared range. The ability of the preform to absorb this radiation and convert it into heat, thereby allowing the preform to reach the orientation temperature for blow molding, is important for optimum bottle performance and efficient production. The heat-up rate of a polyethylene terephthalate preform can be described by surface temperature measurements at a fixed location on a preform for a particular bottle production rate. Important bottle properties for bottle performance are material distribution, orientation, and sidewall crystallinity.

Preform reheat temperature is important for control of these properties. Depending on the kind of bottle being produced, the preform reheat temperature is typically in the range of 30-50° C. above the glass transition temperature ($T_g$) of polyethylene terephthalate. The rate at which a preform can be reheated to the orientation temperature is important for optimal bottle performance in high-speed, polyethylene terephthalate blow-molding machines, such as those manufactured by Sidel, Inc. (LeHavre, France). This is especially true for heat-set bottles that are intended for filling with hot liquids in excess of 185° F. In heat-set bottle production, the preform is reheated rapidly to as high a temperature as possible. This maximizes crystallization upon blow molding and avoids thermal crystallization in the preform.

Another embodiment of the invention is drawn to a method for washing a PET bottle repetitively without degrading the appearance and physical properties of the bottle and/or the molded resin from which the bottle is made. The bottle washing is preferably carried out with water at a temperature of 50° C. greater, more preferably 60° C. greater, more preferably 70° C. greater and less than 100° C. preferably less than 90° C. The temperature of water is preferably sufficient to effectively clean the PRT bottle so that it can be return to CSD use. The water is preferably injected into the interior of the bottle at a pressure of 10-50 psi, preferably 20-40 psi or about 30 psi through one or more nozzles. Preferably the wash water is injected into the bottle so that wash solution impinges on the interior wall of the PET bottle. Preferably the injection nozzle rotates and exposes at least 90%, preferably 95% and most preferably at least 99% of the surface area of the interior of the PET bottle to a high pressure spray.

The wash water may comprise one or more washing agents such as a surfactant, detergent or soap in combination with one or more other additives such as a biocide or abrasive to remove waste or contaminant material adhered to the wall of the bottle and/or to disinfect the interior and/or exterior of the PET bottle. Preferably the wash water is free of abrasives or other suspended solids which may undesirably roughen or damage the interior surface of the PET bottle during high pressure water spray. A roughened or damaged surface may have greater susceptibility to bacterial colonization and/or may make removal of other contaminant materials more difficult. Further to avoid damage or roughening of the interior walls of the PET bottle, no cleaning equipment (e.g., injection nozzle) is in direct contact with the interior wall of the PET bottle. In other embodiments one or more agitating or wiping brushes or membranes may be used to directly contact the interior of the PET bottle for additional cleaning. Preferably any brush or brush fiber is made from a synthetic polymer material that is softer and/or has a greater flexibility in comparison to the PET material from which the PET bottle is made.

EXAMPLES

Testing for multi-wash resilience was carried out by subjecting a blow-molded refillable PET bottle according to the present disclosure to repeated cycles of the following wash procedure: (1) immerse refillable PET bottle in a 3.0±0.5% caustic (NaOH) solution at a temperature of 60° C.±0.1° C. for 15 minutes, (2) remove bottles from the caustic solution and rinse thoroughly inside and outside using cool water having a pH of 6.5-7.5, (3) pressure test the refillable PET bottle at a pressure of 100 psi for 30 seconds, (4) pressure test the refillable PET bottle at a pressure of 45 psi for 7.5 seconds, three times, (5) visually inspect the refillable PET bottle for deformities, optical clarity and physical deterioration such as cracks, (6) repeat the wash cycle (1)-(5) until a failure is noted or 25 wash cycles have been completed, and (7) record visual inspection information after 5 wash cycles, 10 wash cycles 15 wash cycles, 20 wash cycles and 25 wash cycles including obtaining dimensional measurements of the refillable PET bottle. Measurements are obtained at the following locations of the refillable PET bottle: upper bumper, upper panel label, mid-label panel, lower label panel, lower bumper, pinch, base, height, push-up (base clearance) and fill point volume.

FIG. 7 describes the change in the fill point volume for a series of test bottles made from inventive and comparative PET resins. The 5% IPA resin is a conventional PET resin used for blow-molding conventional PET bottles. The vertical axis of the chart describes the change in fill point volume measured in units of milliliters (ml).

The conventional resin containing 5% IPAs shown on the left side of the chart undergoes more than twice the variation in fill point in comparison to the PET resins of the present disclosure which contain 4% IPA or 3% IPA. A substantial reduction in the fill point variability after multiple hot-wash cycles is readily evident with PET resins that contain relatively lower amounts of comonomer (IPA).

Reducing variation in fill point provides a refillable PET bottle that has a more consistent product display. Differences in fill point on a bottle-to-bottle basis give the appearance that certain bottles contain a greater amount of product than others, even though the true liquid volume of consumable product is be the same. The reduction in the change in fill point for the inventive PET resins is believed to be related to the increase in bottle structure stability that is achieved by reducing the amount of comonomer present in the PET resin. The increased amount of comonomer results in a greater resistance to stretch during the blow molding process. This resistance to stretch reduces the structural variability (improved dimensional stability) of the blow-molded PET bottle. This in turn results in the formation of PET bottles having less bottle-to-bottle variability with respect to structure.

A series of test resins was manufactured by carrying out esterification and polycondensation of a series of diacid/diol monomer mixtures in the presence of several catalyst compositions. The table below provides the compositional characteristics of the PET resins in terms of comonomer content (balance IPA) and the amount of catalyst residues present as the elemental metal in the PET resin. The intrinsic viscosity (IV) for each PET resin is shown in the table. Each of the resins was used to form a preform which was subsequently blow-molded to form a refillable PET container which was subsequently tested for wash stability after application of a hot-wash regimen.

TABLE 1

PET resin properties

| Sample | IPA | CHDM | Sb (ppm) | Ti (ppm) | IV |
|---|---|---|---|---|---|
| C1 | 5.3 | — | 230 | — | 0.81 |
| C2 | 4.0 | — | 280 | — | 0.81 |
| C3 | — | 2.6 | 250 | — | 0.85 |
| T1 | 3.0 | — | 200 | 3 | 0.81 |
| T2 | 3.0 | — | 125 | 3 | 0.82 |
| T3 | 3.0 | — | 75 | 5 | 0.85 |
| T4 | — | 1.95 | 200 | 3 | 0.83 |

Figure 8:
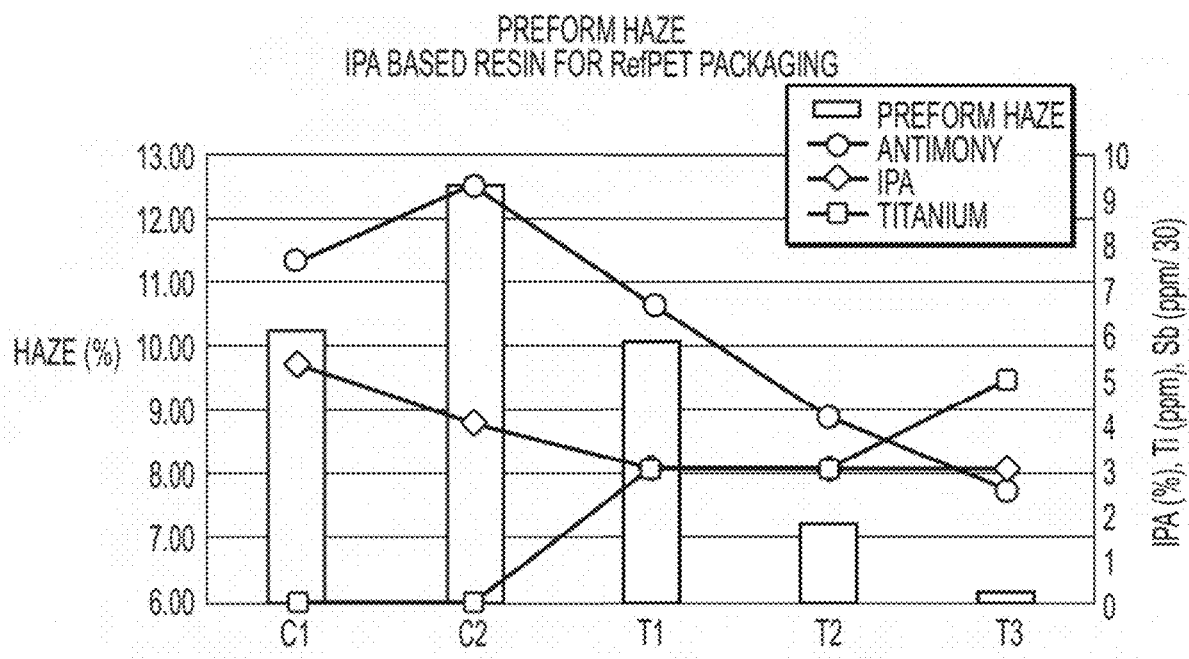
FIG. 8 shows haze of PET preforms of different comonomer content and catalyst compositions.

The haze of preforms made by injection molding the respective resins is described in FIG. 8. Resins T1-T3 of FIG. 8 are inventive and contain relatively low amounts of comonomer (3.0% IPA) and a reduced amount of antimony (e.g., 75-200 ppm). The haze values for Examples T1-T3 are lower than what is conventionally expected. The decreased amount of comonomer would conventionally be expected to result in greater haze, especially in a relatively heavy weight preform such as the preform used in the present examples (i.e., a preform of weight of 109 g for making a 2.5 liter refillable bottle). For comparison, the C1 resin has a significantly greater amount of comonomer (nearly twice the amount of comonomer as the inventive T1-T3 PET resins) and forms a preform having a haze of slightly more than 10%. Ordinarily, reduction in the amount of IPA and a tendency towards greater orientation would form an injection-molded article having greater haze. However, in Examples T1-T3 the concurrent reduction in the amount of the nucleating metal antimony forms a PET preform that has a lesser tendency towards haze in comparison to the C1 PET resin containing nearly twice the amount of comonomer. Color and Haze are determined by Transmission according to ASTM D-1003-B.

The preforms of Table 1 were blow-molded on the same mold using the same mold conditions to form groups of refillable test bottles. Each group of test bottles made from comparative and inventive PET resins, respectively, was subject to hot-wash cycles to determine resistance to washing. The failures are shown in Table 2 below according to earliest wash failure, average wash failure and last wash failure with respect to both base burst/leak and sidewall burst/leak.

TABLE 2

Occurrence of failure, last wash cycle without observable failure.

|  | 1st | ave | last |
|---|---|---|---|
| C1 | 7 | 12.8 | 19 |
| C2 | 20 | 22.2 | 24 |
| C3 | 24 | 24.75 | — |
| T1 | 15 | 17.5 | 20 |
| T2 | 21 | 22.3 | 23 |
| T3 | 16 | 16.7 | 18 |
| T4 | 25 | 25 | 25 |

In Table 2 the "first failure" identifies the last wash cycle that was completed without failure. Each bottle and each series of bottles was subject to 25 hot-wash cycles. A bottle that passed 25 wash cycles without failure identifies the first, average and last wash cycle as 25. The "last" wash cycle identifies the longest period any bottle was able to withstand multiple hot-wash cycles in a group of bottles.

Figure 9:
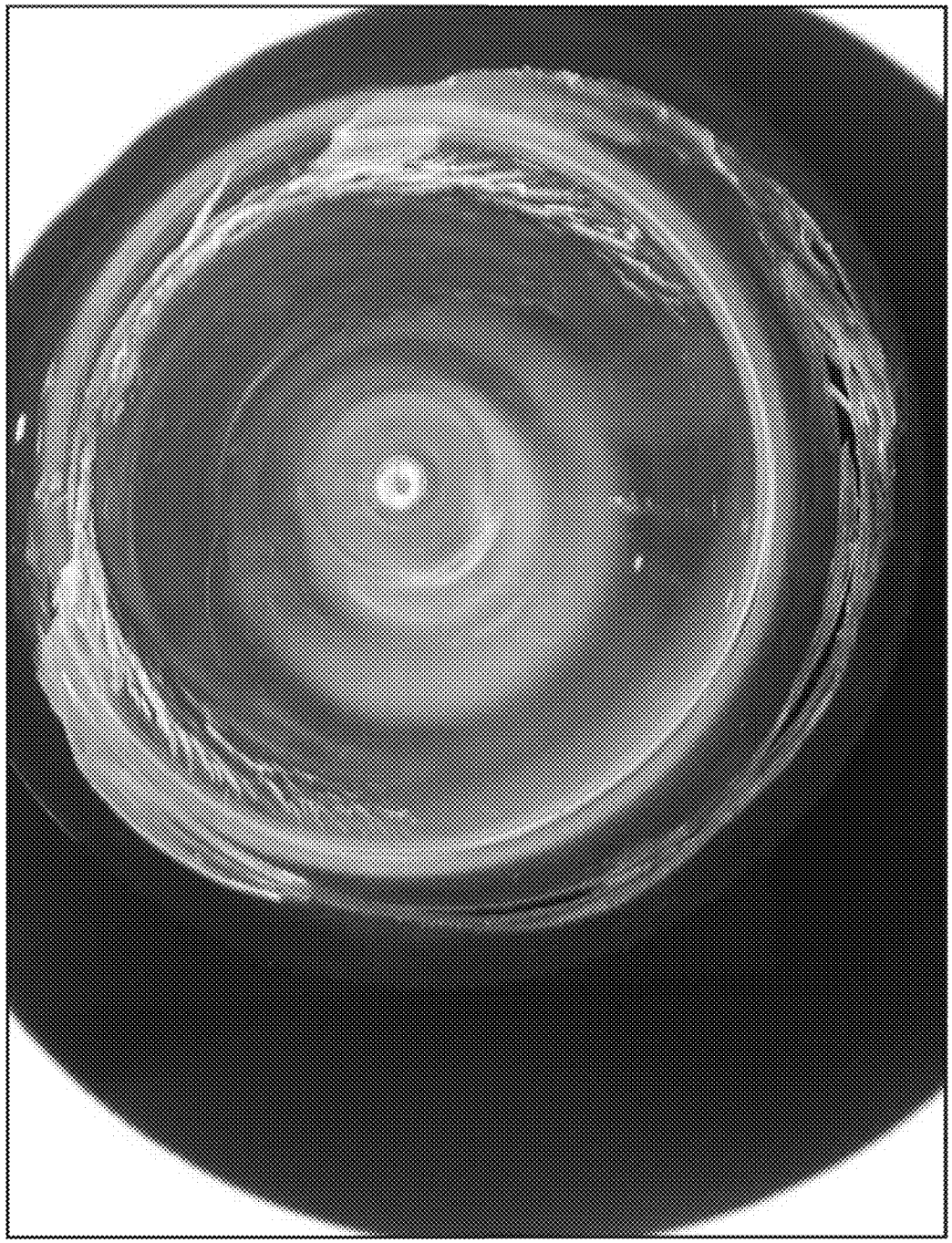
FIG. 9 shows a base burst failure.
Figure 10:
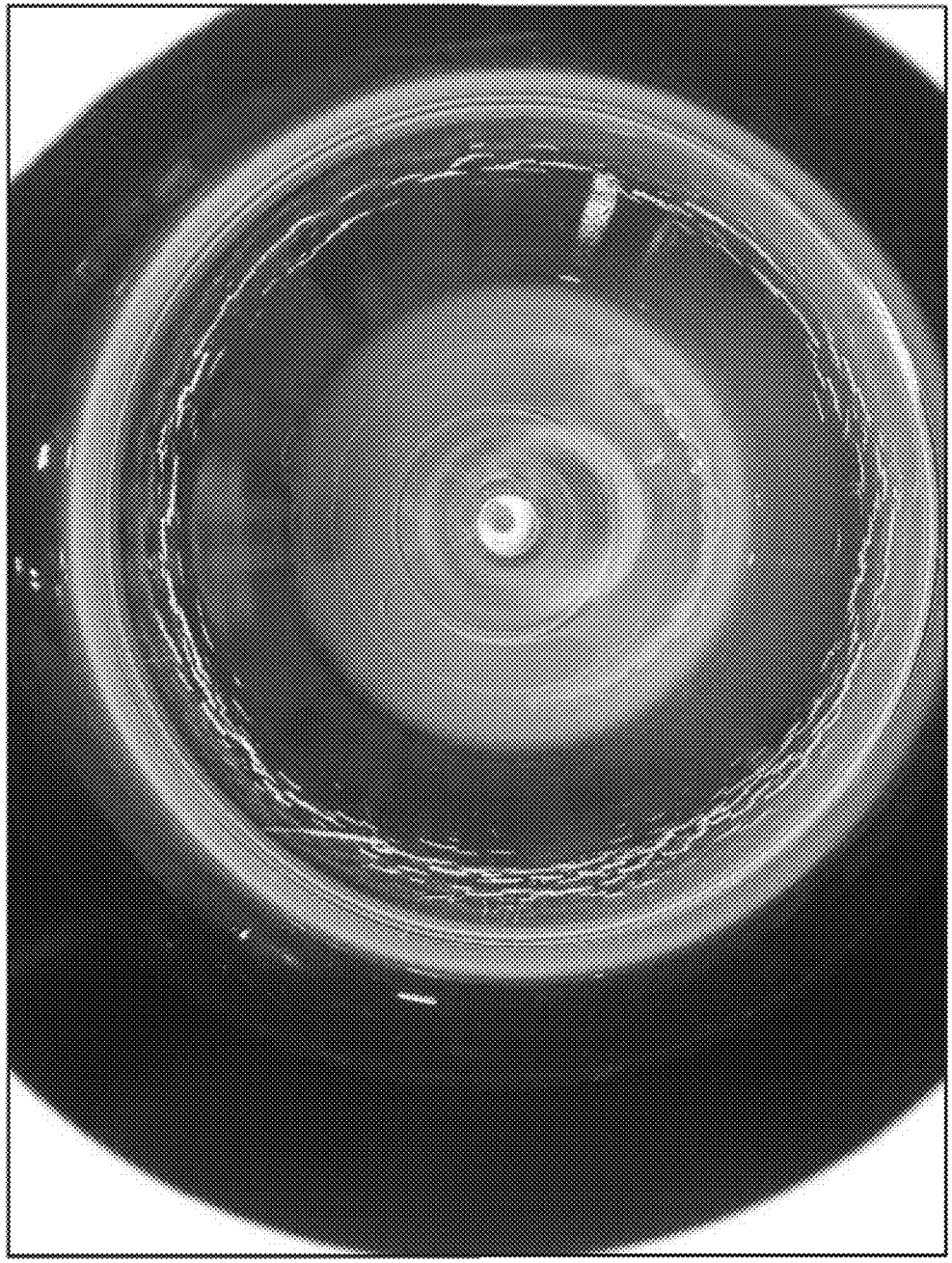
FIG. 10 shows a stressed base without failure.

A typical base burst failure is described in FIG. 9. The base of the bottle separates or fractures from the bottle body thereby permitting leakage of contents from the bottle. FIG. 10 describes the base of a bottle subject to multiple hot-wash cycles showing stress in the base but no failure, e.g., no possibility for leakage.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A polyester resin composition, comprising:
a polyester resin comprising polycondensed units of one or more dicarboxylic acids and one or more diols, wherein the dicarboxylic acid comprises from 90 mol % to 97 mol % percent of terephthalic acid and the diol comprises from 90 mol % to 99 mol % of ethylene glycol;
wherein the polyester resin has an intrinsic viscosity of from 0.81 to 0.85 dl/g and a haze of less than 5% at a thickness of between 4.5 and 6 mm according to ASTM D-1003-B;
wherein the polyester resin further comprises polycondensed units of isophthalic acid in an amount of 3-4 mol % based on the total moles of polycondensed units of dicarboxylic acid in the polyester resin, and cyclohexane dimethanol in an amount of 1 to 3 mol % based on the total moles of polycondensed units of diols in the polyester resin; and
the polyester resin composition comprises from 125 to 200 ppm of Sb and 2 to 5 ppm of Ti, and
wherein a change in the fill point volume after 5 wash cycles of a 2.5 liter blow molded bottle that is blow molded from the polyester resin composition is 14 ml or less.

2. The polyester resin composition of claim 1, comprising:
3 to 5 ppm of Ti, and wherein the polyester resin comprises 3 mol % polycondensed units of isophthalic acid.

* * * * *